US008796905B2

(12) United States Patent
Nagase et al.

(10) Patent No.: US 8,796,905 B2
(45) Date of Patent: Aug. 5, 2014

(54) MOTOR DEVICE, METHOD OF MANUFACTURING MOTOR DEVICE, AND ROBOT DEVICE

(75) Inventors: Takashi Nagase, Iruma (JP); Masashi Okada, Yotsukaido (JP); Akimitsu Ebihara, Sennan-gun (JP)

(73) Assignee: Nikon Corporation, Tokyo (JP)

( * ) Notice: Subject to any disclaimer, the term of this patent is extended or adjusted under 35 U.S.C. 154(b) by 203 days.

(21) Appl. No.: 13/064,545

(22) Filed: Mar. 30, 2011

(65) Prior Publication Data
US 2011/0241485 A1 Oct. 6, 2011

Related U.S. Application Data

(60) Provisional application No. 61/406,344, filed on Oct. 25, 2010, provisional application No. 61/406,723, filed on Oct. 26, 2010.

(30) Foreign Application Priority Data

Mar. 31, 2010 (JP) .............................. P2010-082556
Mar. 31, 2010 (JP) .............................. P2010-083377

(51) Int. Cl.
*H02N 2/12* (2006.01)
(52) U.S. Cl.
USPC .................................................. 310/323.01
(58) Field of Classification Search
USPC ................................ 310/323.01–323.21, 328
See application file for complete search history.

(56) References Cited

U.S. PATENT DOCUMENTS

2003/0052575 A1    3/2003  Mock et al.
2006/0119225 A1*   6/2006  Heim et al. ................... 310/339

FOREIGN PATENT DOCUMENTS

| JP | 2-261073    | 10/1990 |
| JP | 2-290170    | 11/1990 |
| JP | 2-311237    | 12/1990 |
| JP | 2000-116160 |  4/2000 |
| JP | 2003-516100 |  5/2003 |

OTHER PUBLICATIONS

International Search Report issued Jun. 28, 2011 in corresponding International Patent Application PCT/JP2011/057642.
Written Opinion of the International Searching Authority issued Jun. 28, 2011 in corresponding International Patent Application PCT/JP2011/057642.

* cited by examiner

*Primary Examiner* — Derek Rosenau
(74) *Attorney, Agent, or Firm* — Staas & Halsey LLP

(57) ABSTRACT

A motor device includes a base portion; a transmission portion that is formed with the base portion as one member and is wound around at least a part of an outer periphery of a rotator; and a driving portion which is supported by the base portion, moves the transmission portion by a certain distance in a state in which a rotational force is transmitted between the rotator and the transmission portion, and returns the transmission portion to a predetermined position in a state in which the rotation force transmission state is released.

30 Claims, 20 Drawing Sheets

MOTOR DEVICE, METHOD OF MANUFACTURING MOTOR DEVICE, AND ROBOT DEVICE

CROSS-REFERENCE TO RELATED APPLICATION

This application is a non-provisional application claiming priority to and the benefit of U.S. provisional application No. 61/406,344, filed Oct. 25, 2010 and U.S. provisional application No. 61/406,723, filed Oct. 26, 2010, and claims priority to Japanese Patent Application No. 2010-082556, filed Mar. 31, 2010 and Japanese Patent Application No. 2010-083377, filed Mar. 31, 2010. The entire contents of which are incorporated herein by reference.

FIELD OF THE INVENTION

The present invention relates to a motor device, a method of manufacturing a motor device, and a robot device.

DESCRIPTION OF THE RELATED ART

As, for example, an actuator that drives an evolution system machine, a motor device is used. As such a motor device, an electric motor or an ultrasonic wave motor is widely known that is capable of generating high torque (for example, see JP-A-H2-311237). Recently, there is a need for a motor device that drives a higher precision portion such as a joint of a humanoid robot, and there is a need for a configuration that can provide miniaturization and controllability of torque and can perform detailed high precision driving even in existing motors such as an electric motor or an ultrasonic wave motor.

However, in the electric motor or the ultrasonic motor, since there is a need to attach a reduction gear so as to generate high torque, there is a limitation in the miniaturization. Furthermore, in the ultrasonic motor, the control of torque is difficult.

An object of aspects according to the present invention is to provide a motor device that is capable of generating high torque.

SUMMARY

A motor device according to an aspect of the present invention comprises a base portion; a transmission portion that is formed with the base portion as one member and is wound around at least a part of an outer periphery of a rotator; and a driving portion which is supported by the base portion, moves the transmission portion by a certain distance in a state in which a rotational force is transmitted between the rotator and the transmission portion, and returns the transmission portion to a predetermined position in a state in which the rotation force transmission state is released.

A method of manufacturing a motor device according to an aspect of the present invention comprises forming a base portion and a transmission portion is provided, which is around at least a part of an outer periphery of a rotator, as one member; and attaching a driving portion, which moves the transmission portion by a certain distance in a state in which a rotational force is transmitted between the rotator and the transmission portion and returns the transmission portion to a predetermined position in a state in which the rotation force transmission state is released, to the base portion.

A motor device according to an aspect of the present invention comprises a base portion; a transmission portion that is formed with the base portion in one member and is wound around at least a part of a rotator; a driving portion that, while a rotational force is transmitted between the rotator and the transmission portion, moves the transmission portion by a certain distance, and that, while the rotation force transmission state is released returns the transmission portion to a predetermined position; and a portion that is formed with the base portion in one member and supports the transmission portion.

A motor device according to an aspect of the present invention comprises a transmission portion that is wound to at least part of an outer periphery of a rotator; a driving portion which moves the transmission portion by a certain distance in a state in which a rotational force is transmitted between the rotator and the transmission portion, returns the transmission portion to a predetermined position in a state in which the rotation force transmission state is released; and an elastic portion that causes an elastic force to act on the transmission portion in a direction to be separated from the rotator.

A robot device according to an aspect of the present invention comprises a rotation shaft member and a motor device for rotating the rotation shaft member and in which the motor device of the present invention is used as a motor device.

A method of manufacturing a motor device according to an aspect of the present invention comprises forming a base portion and a transmission portion that is wound around at least a part of a rotator in a substrate that is one member; and forming a portion, in which a driving portion that moves the transmission portion is arranged, in the base portion.

According to the aspects of the present invention, it is possible to provide a motor device that can generate a high torque.

DESCRIPTION

First Embodiment

Hereinafter, embodiments of the present invention will be described based on the drawings.

Figure 1A:
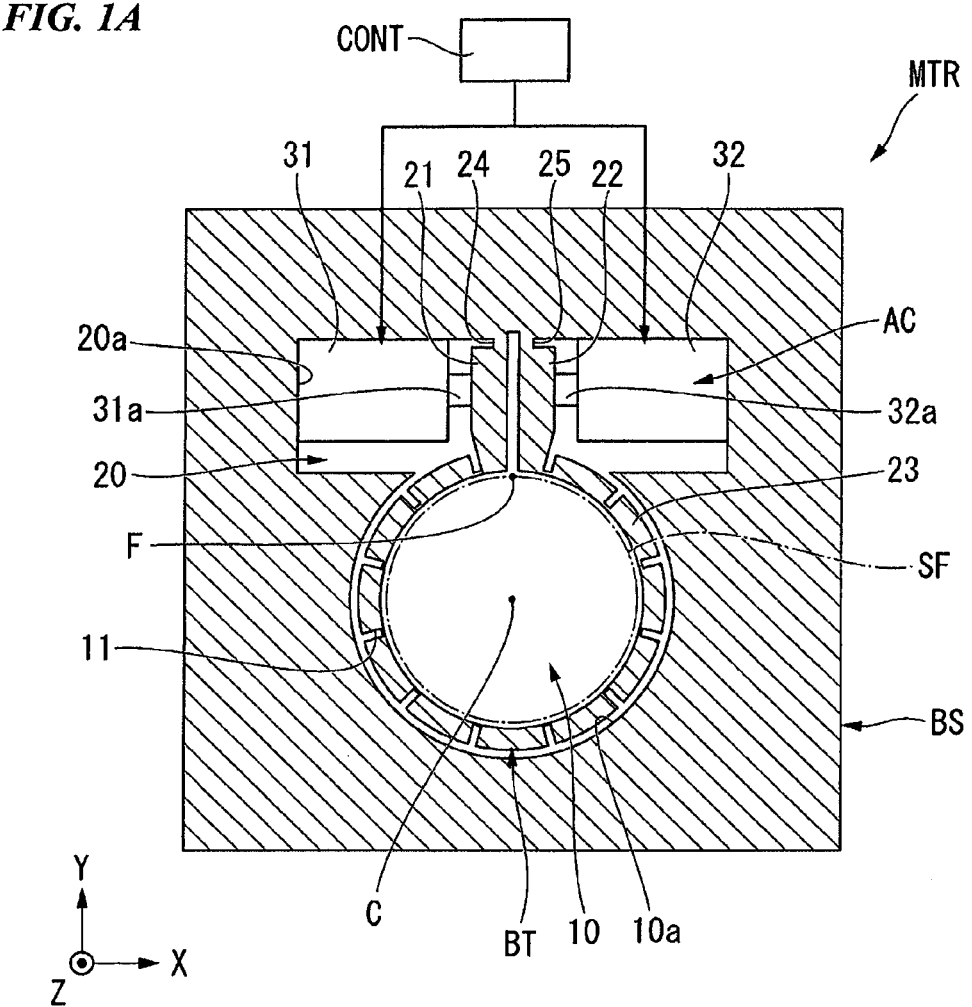
FIG. 1A is a front view diagram that shows a configuration of a motor device according to a first embodiment of the present invention.
Figure 1B:
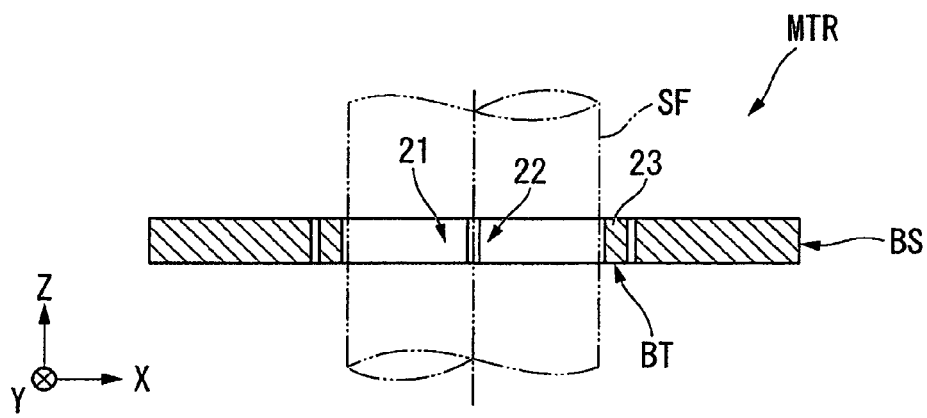
FIG. 1B is a plan view diagram that shows a configuration of a motor device according to the embodiment.

FIG. 1 is a schematic configuration diagram that shows an example of a motor device MTR according to a first embodiment. FIG. 1A is a front view thereof and FIG. 1B is a plan view thereof.

As shown in FIGS. 1A and 1B, the motor device MTR has a base portion BS, a transmission portion BT, a driving portion AC, and a control device CONT. The motor device MTR rotates a rotator SF shown in FIGS. 1A and 1B by an alternate long and short dashed line. In the motored device MTR, the base member BS and the transmission portion BT are formed as one member. Furthermore, the rotator SF has a rotational axis (center axis) C (an axis parallel to a Z axis of FIG. 1A).

The base portion BS is, for example, a portion that is formed in a plate shape using a material such as stainless steel. In the base portion BS, a penetration portion 10 and a penetration portion 20 are formed. The penetration portion 10 is an opening portion that is formed in substantially a circular shape when seen from the front, and is formed through both surfaces of the base portion BS. In the penetration portion 10, the rotator SF is inserted. The penetration portion 20 is an opening portion that is formed in substantially a rectangular shape when seen from the front, for example, so as to partially overlap with the penetration portion 10, and is formed through both surfaces of the base portion BS. The driving portion AC is disposed in the penetration portion 20.

The transmission portion BT has a first end portion 21, a second end portion, 22 and a belt portion 23. The first end portion 21 and the second end portion 22, for example, extend from a center portion of an X direction of the penetration portion 10 to a +Y direction and are connected to the inner peripheral portion 20a of the base portion BS. A connection portion 24 between the first end portion 21 and the inner peripheral portion 20a is formed to be thinner than other portions of the first end portion 21. Similarly, a connection portion 25 between the second end portion 22 and the inner peripheral portion 20a is formed to be thinner than other portions of the second end portion 22. Thus, the first end portion 21 and the second end portion 22 rotate in a θZ direction using the connection portions 24 and 25 as fulcrums. The first end portion 21 and the second end portion 22 are disposed so as to interpose a standard position F on an outer periphery position F of the rotator SF therebetween. In the present embodiment, a case will be described as an example where, for example, a +Y side end portion of the rotator SF in FIG. 1 is the standard position F.

The belt portion 23 is formed, for example, in a band shape along an inner peripheral portion 10a of the base portion BS, and is formed to have an elastically deformable thickness. The belt portion 23 is disposed so as to surround the rotator SF to be inserted into the penetration 10. In other words, the rotator SF is inserted into a space of the penetration portion 10 surrounded by the belt portion 23. The belt portion 23 is wound, for example, around at least a part of the rotator SF.

A plurality of cutting portions 11 is formed in the belt portion 23. The cutting portions 11 are formed, for example, in an outer peripheral surface (a surface facing an inner peripheral portion 10a) of the belt portion 23. The cutting portions 11 are formed, for example, all over the longer direction (a direction along the inner peripheral portion 10a) of the belt portion 23 by substantially an equal interval. The cutting portions 11 facilitate the deformation of the belt portion 23.

The driving portion AC is supported by the inner peripheral portion 20a of the base portion BS. The driving portion AC has a driving element 31 (a first electromechanical conversion element) and a driving element (a second electromechanical conversion element) 32. Each driving element includes an electromechanical conversion element such as, for example, a piezo element.

The driving elements 31 and 32 have a configuration which extends and contracts in the X direction by the application of the voltage to the electromechanical conversion element. The control device CONT is connected to the driving portion AC and is adapted to be able to supply the control signal to the driving portion AC.

The driving element 31 and the driving element 32 are provided in positions that interpose the first end portion 21 and the second end portion 22 therebetween. The front end portion 31a of the driving element 31 faces the first end portion 21 and the front end portion 32a of the driving element 32 faces the second end portion 22. Thus, the driving element 31 and the driving element 32 are configured so that the front end portion 31a faces the front end portion 32a. The front end portion 31a of the driving element 31 is connected to, for example, the first end portion 21. The front end portion 32a of the driving element 32 is connected to, for example, the second end portion 22.

An end surface of −X side of the driving element 31 is supported by, for example, the inner peripheral portion 20a of the base portion BS. Furthermore, an end surface of +X side of the driving element 32 is supported by, for example, the inner peripheral portion 20a of the base portion. The driving element 31 is extended and contracted, whereby the first end portion 21 is moved in the X direction and is rotated in θZ direction. Furthermore, the driving element 32 is extended and contracted, whereby the second end portion 22 is moved in the X direction and is rotated in θZ direction. For this reason, the first end portion 21 and the second end portion 22 are moved to the inside from the tangential direction in the standard position F of the rotator SF by the deformation of the driving element 31 and the driving element 32.

When the driving element 31 is stretched in the +X direction and the driving element 32 is stretched in the −X direction, the first end portion 21 and the second end portion 22 approach each other. For this reason, the belt portion 23 is wound around the rotator SF, and the tension is applied to the belt portion 23. When the driving element 31 is shortened in the −X direction and the driving element 32 is shortened in the +X direction, the first end portion 21 and the second end portion 22 are separated from each other. For this reason, the belt portion 23 is separated and relaxed from the rotator SF.

Next, the driving operation of the rotator SF will be described.

In the motor device MTR according to the present embodiment, the principles of driving the rotator SF will be described. When driving the rotator SF, an effective tension is generated in the transmission portion BT wound around the rotator SF, and the torque is transmitted to the rotator SF by the effective tension.

When a tension T1 of the first end portion 21 side and a tension T2 of the second end portion 22 side of the transmission portion BT wound around the rotator SF satisfies the following [Equation 1] by Euler's frictional belt theory, the frictional force is generated between the transmission portion BT and rotator SF, and the transmission portion BT is moved together with the rotator SF in a state (a rotational force transmission state) in which the transmission portion BT does not slip with respect to the rotator SF. By this movement, the torque is transmitted to the rotator SF. However, in [Equation 1], μ is an external frictional coefficient between the transmission portion BT and the rotator SF, and θ is an efficient winding angle of the transmission portion BT.

$$T_1 = T_2 \cdot e^{\mu\theta}$$ [Equation 1]

At this time, the effective tension contributing to the transmission of the torque is indicated by (T1−T2). When the effective tension (T1−T2) is obtained based on Equation 1], [Equation 2] is provided. [Equation 2] is an equation that indicates the effective tension using T1.

$$T_1 - T_2 = (e^{\mu\theta} - 1/e^{\mu\theta}) \cdot T_1$$ [Equation 2]

Figure 2:
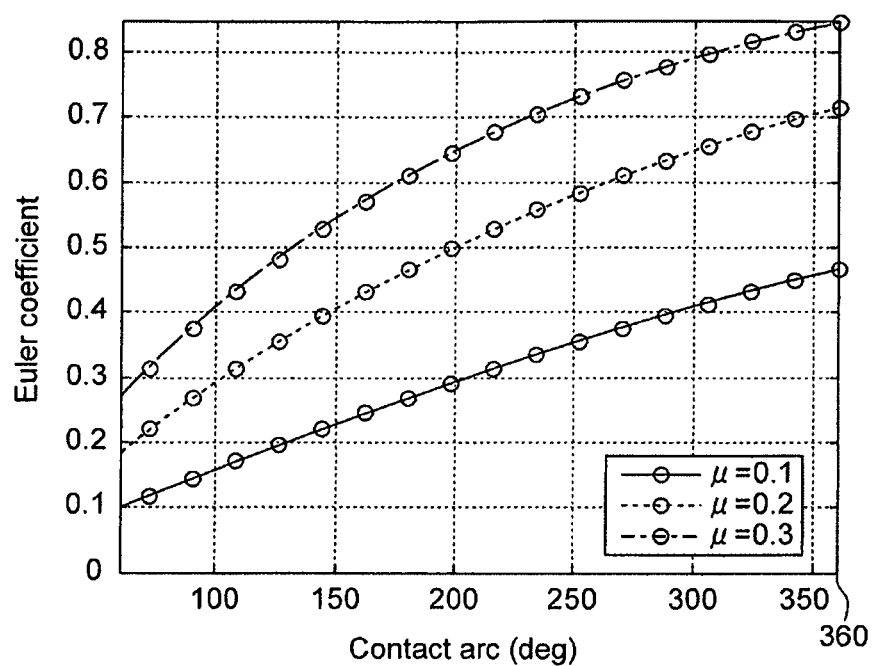
FIG. 2 is a graph that shows a property of a motor device according to embodiments of the present invention.

From [Equation 2], it can be understood that the torque to be transmitted to the rotator SF is arbitrarily determined by the tension T1 of the driving element 31. A coefficient portion of T1 of a right side of [Equation 2] depends on the frictional coefficient μ between the transmission portion BT and the rotator SF and the efficient winding angle θ of the transmission portion BT, respectively. FIG. 2 is a graph that shows a relationship between the efficient winding angle θ when the frictional coefficient μ is changed and the value of the coefficient portion. A transverse axis of the graph indicates the efficient winding angle θ and a longitudinal axis of the graph indicates the value of the coefficient portion.

As shown in FIG. 2, when the frictional coefficient μ is 0.3 and the efficient winding angle θ is greater than or equal to 300°, the value of the coefficient portion is greater than or equal to 0.8. From this, it is understood that, when the frictional coefficient μ is 0.3, by setting the efficient winding angle θ to be greater than or equal to 300°, a force of 80% or more of the tension T1 due to the driving element 31 contributes the torque of the rotator SF. In addition to the winding angle, from the graph of FIG. 2, it is estimated that the larger the frictional coefficient between the transmission portion BT and the rotator SF is, the larger the value of the coefficient portion.

In this manner, it is understood that the size of the torque is arbitrarily determined by the tension T1 of the driving element 31 and is substantially not related to, for example, the movement distance or the like of the transmission portion BT. Thus, for example, a piezo element or the like used in the driving element 31 and the driving element 32 can generate the force of several hundreds of Newtons or more even in a small element of around several millimeters, and thus can apply a very large rotational force.

Figure 3:
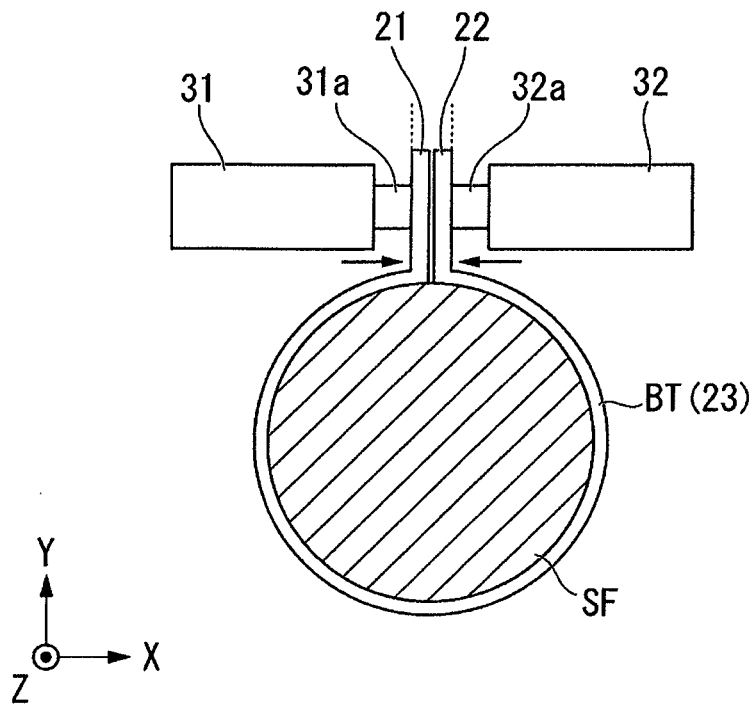
FIG. 3 is a diagram that shows an operation of a motor device according to the embodiment.

Based on the principle, as shown in FIG. 3, the control device CONT firstly deforms the driving element 31 and the driving element 32 so that the first end portion 21 is moved in the +X direction and the second end portion 22 is moved in the −X direction. By this operation, the tension T1 is generated in the first end portion 21 side of the transmission portion BT, and the tension T2 is generated in the second end portion side 22 of the transmission portion BT. Thus, the effective tension (T1−T2) is generated in the transmission portion BT.

Figure 4:
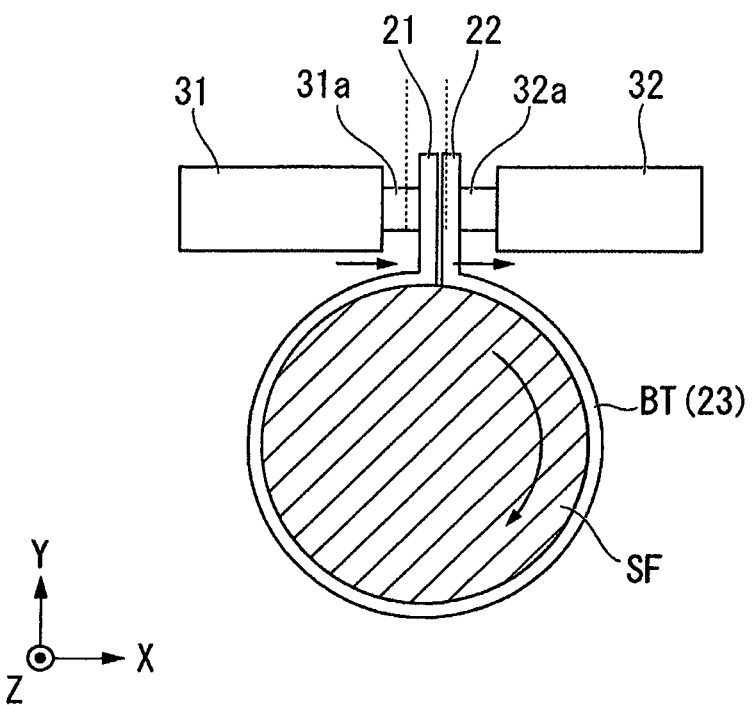
FIG. 4 is a diagram that shows an operation of a motor device according to the embodiment.

The control device CONT deforms the driving element 31 and the driving element 32 so that, as shown in FIG. 4, the first end portion 21 of the transmission portion BT is moved in the +X direction and the second end portion 22 is moved in the +X direction while maintaining the state of generating the effective tension in the transmission portion BT (a driving operation). In the operation, the control device CONT makes the movement distance of the first end portion 21 equal to the movement distance of the second end portion 22. By this operation, the transmission portion BT is moved in the state in which the frictional force is generated between the transmission portion BT and the rotator SF, and the rotator SF is moved in the θZ direction along with the movement.

In the present embodiment, the frictional coefficient μ between the transmission portion BT and the rotator SF is, for example, 0.3, and the transmission portion BT is wound around the rotator SF by substantially one rotation) (360°). Thus, referring to the graph of FIG. 2, a force of about 85% of the tension T1 of the driving element 31 is transmitted to the rotator SF as the torque.

Figure 5:
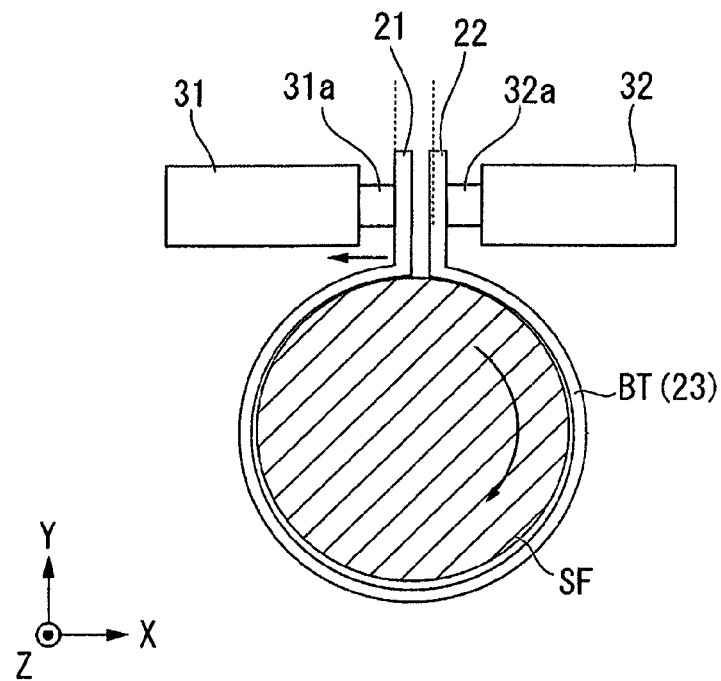
FIG. 5 is a diagram that shows an operation of a motor device according to the embodiment.

The control device CONT moves the first end portion 21 and the second end portion 22 by a predetermined distance, and then as shown in FIG. 5, deforms only the driving element 31 so that the first end portion 21 returns to a start position (a predetermined position) of the driving and the second end portion 22 is not moved. By this operation, the first end portion 21 is moved in the −X direction, and the winding of the transmission portion BT is loosened. That is, the effective tension applied to the transmission portion BT is released. In this state, the frictional force is not generated between the transmission portion BT and the rotator SF, and the rotator SF continues to rotate by inertia.

Figure 6:
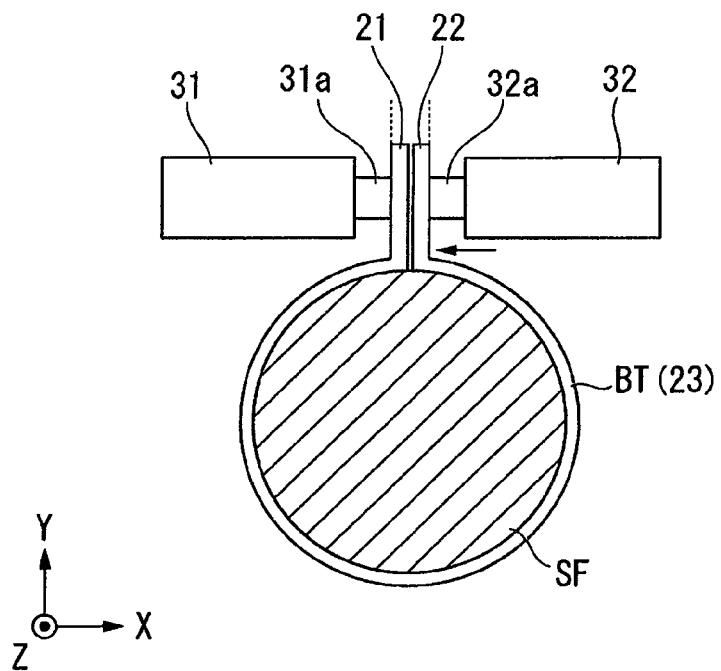
FIG. 6 is a diagram that shows an operation of a motor device according to the embodiment.

The control device CONT loosens the winding of the transmission portion BT, and then, as shown in FIG. 6, deforms the driving element 32 so that the second end portion 22 returns to the start position (a predetermined position) of the driving. By this operation, in a state in which the winding of the transmission portion BT is loosened, that is, in a state in which the effective tension is not generated, the second end portion 22 of the transmission portion BT returns to the start position (a predetermined position) of the driving (a return operation).

Immediately before the second end portion 22 returns to the driving start position, the control device CONT deforms the driving element 31 and moves the first end portion 21 in the +X direction. By this operation, at roughly the same time as the second end portion 22 returns to the driving start position, the tension T1 is generated in the first end portion 21 side of the transmission portion BT, and the tension T2 is generated in the second end portion 22 side of the transmission portion BT. As a result, there is provided the same state (the state of FIG. 3) as the state in which the effective tension is added to the transmission portion BT at the time of the driving start.

After the effective tension is added to the transmission portion BT, the control device CONT deforms the driving element 31 so that the first end portion 21 of the transmission portion BT is moved in the +X direction and deforms the driving element 32 so that the second end portion 22 is moved in the +X direction (driving operation). At this time, the movement distance of the first end portion 21 is made equal to the movement distance of the second end portion 22. By this operation, the transmission portion BT is moved in a state in which the frictional force is generated between the transmission portion BT and the rotator SF, and the rotator SF is rotated in the θZ direction together with the movement.

After that, the control device CONT releases the effective tension which is added to the transmission portion BT again. The control device CONT moves the transmission portion BT so that first end portion 21 and the second end portion 22 thereof return to the start position after releasing the effective tension in the manner of FIG. 5 (a return operation). In this manner, the control device CONT causes the driving operation and the return operation to be repeatedly performed in the driving portion AC, whereby the rotator SF continues to rotate in the θZ direction.

Next, the manufacturing method of the motor device MTR will be described.

Figure 7:
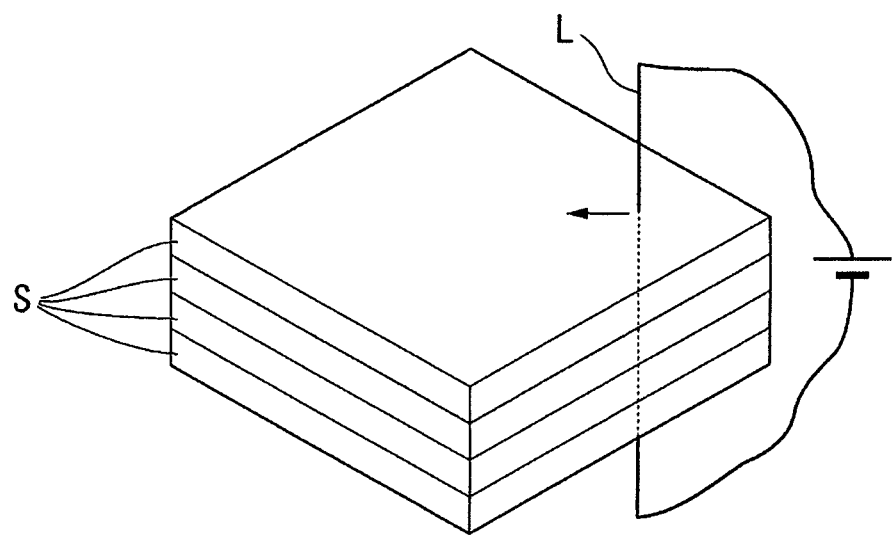
FIG. 7 is a diagram that shows a manufacturing process of a motor device according to the embodiment.

When manufacturing the motor device MTR, firstly, the base portion BS and the transmission member BT are formed as one member. For example, as shown in FIG. 7, a plurality of substrates S is stacked, and the plurality of the substrates S is arranged, cut, and formed. For example, a voltage is applied to a metallic linear member L such as a wire and is electrically discharged, and a cutting process is performed on the substrates S in a manner of a fretsaw, while causing relative movement between the wire and the substrates S.

Furthermore, in addition to the above, molds of the base portion BS and the transmission portion BT, which are formed in one member, may be formed and may be formed by casting. Furthermore, the substrates may be formed by extrusion molding using an extrusion mold of the base portion BS and the transmission portion BT, which are formed as one member. Furthermore, the base portion BS and the transmission portion BT may be formed by pattening using a photolithography method. After forming the base portion BS and the transmission portion BT in one member, the driving portion AC is attached to the base portion BS, whereby the motor device MTR is completed.

In this manner, according to the present embodiment, since the driving portion AC performs the driving operation and the return operation in the state in which the transmission portion BT is wound around at least part of the rotator SF, by Euler's frictional belt theory, the torque is arbitrarily determined by one tension applied to transmission portion BT. Thus, even when a reduction gear or the like is not attached, and even in a small driving portion AC, it is possible to apply high torque to the rotator SF. As a result, it is possible to obtain a small motor device MTR capable of generating high torque. Furthermore, even in a small driving portion AC, it is possible to rotate the rotator SF with high efficiency. Furthermore, according to the present embodiment, it is easy to control the torque of the motor device MTR.

Furthermore, according to the present embodiment, since the base portion BS and the base portion BS are formed in one member, it is possible to manufacture at low cost and with a simple manufacturing process. Furthermore, since the driving portion AC is attached to the base portion BS, the base portion BS, the transmission portion BT and the driving portion AC, which are components of the motor device MTR, are integrally formed. For this reason, there is provided a motor device MTR having a superior handling property during attachment and detachment to the rotator SF, during carriage (transportation), during storage or the like.

Second Embodiment

Next, a second embodiment of the present invention will be described.

The present embodiment is different from the first embodiment in that an elastic deformation of the transmission portion BT is used at the time of the operation of the motor device MTR. Thus, regarding a configuration of the motor device MTR, it is possible to use the same configuration as the first embodiment except that the transmission portion BT is elastically deformable.

In the present embodiment, a spring constant of the transmission portion BT is set as k. Herein, by Euler's frictional belt theory, a retention $T_C$ of the rotator SF is set as the following [Equation 3]. The retention $T_C$ is a force that is needed to start to move the stopped rotator SF. Furthermore, if a target tension of the first end portion 21 side is set as $T_{1e}$, a target tension of the second end portion 22 side is set as $T_{2e}$, and an objective effective tension is set as $T_{goal}$, the hereinbelow [Equation 4] and [Equation 5] are satisfied.

$$T_c = (T_{1e} + T_{2e})/2 \qquad \text{[Equation 3]}$$

$$T_{1e} + T_{goal} \cdot e^{\mu\theta}/(e^{\mu\theta}-1) \qquad \text{[Equation 4]}$$

$$T_{2e} = T_{goal}/(e^{\mu\theta}-1) \qquad \text{[Equation 5]}$$

Hereinafter, the driving operation of the rotator SF will be described in priority based on FIGS. 8 to 13. In the present embodiment, in order to facilitate the description, the configuration of the motor device is schematically shown. Thus, for example, a contact angle of the transmission portion BT or the like, there is difference from a real configuration in drawing.

In addition, in FIGS. 8 to 13, the description will be made such that, in the driving element 31 and the first end portion 21, a right side in the drawings is in the +X direction, and, in the driving element 32 and the second end portion 22, a left side in the drawings is in the +X direction.

In the following description, the positions of the first end portion 21 and the second end portion 22 of the transmission portion BT, which enters the state in which transmission portion BT is wound around the rotator SF by one rotation without applying the tension to the transmission portion BT, are set to a starting point position 0. Thus, in a state in which both the first end portion 21 and the second end portion 22 of the transmission portion BT are disposed in the starting point position 0, frictional force is not generated between the transmission portion BT and the rotator SF.

<Driving Operation>

Figure 8:
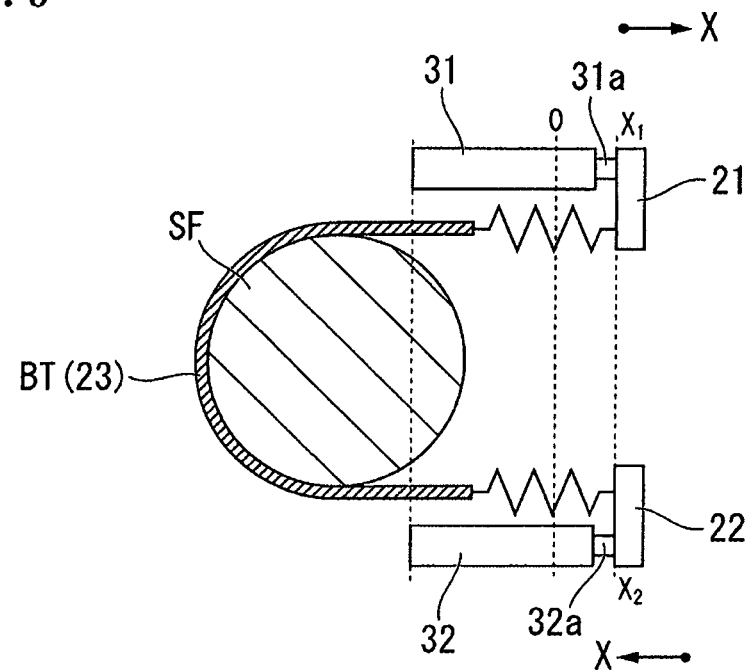
FIG. 8 is a diagram that shows an operation of a motor device according to a second embodiment of the present invention.

Firstly, as shown in FIG. 8, the control device CONT deforms the driving element 31 such that the first end portion 21 of the transmission portion BT is moved from the starting point position 0 to $X_1$ in the +X direction (the right side of FIG. 8). Furthermore, the control device CONT deforms the driving element 32 such that the second end portion 22 of the transmission portion BT is moved from the starting point position 0 to $X_2$ in the −X direction (the right side of FIG. 8). The state is called an initial state of the driving operation. At this time, $X_1$ and $X_2$ satisfy the following [Equation 6].

$$x_1 = x_2 = T_c/K \qquad \text{[Equation 6]}$$

K: spring constant of a belt

Figure 9:
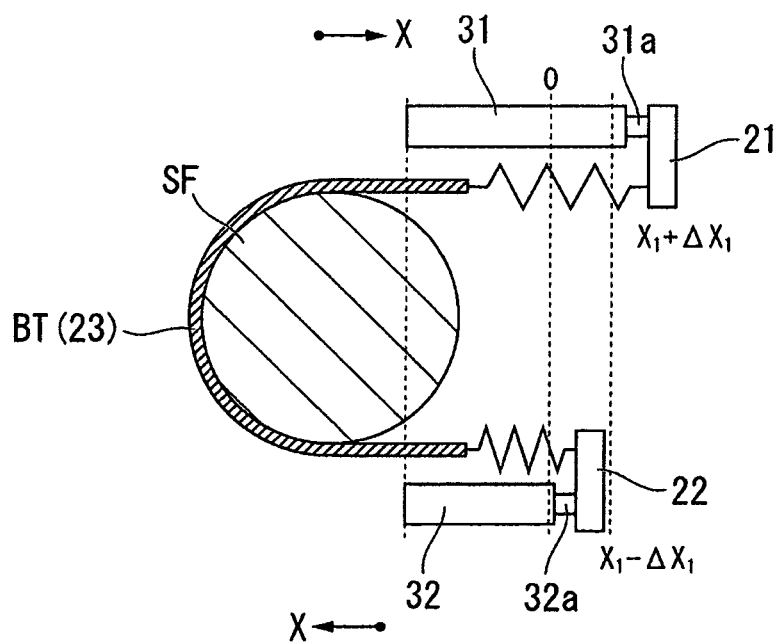
FIG. 9 is a diagram that shows an operation of a motor device according to the embodiment.

From this state, as shown in FIG. 9, the control device CONT deforms the driving element 31 and moves only the first end portion 21 to move $\Delta X_1$ in the +X direction (the right side of FIG. 9) such that the tension $T_1$ of the first end portion 21 side of the transmission portion BT becomes the target tension $T_{1e}$. Furthermore, the control device CONT deforms the driving element 32 and causes the second end portion 22 to move $\Delta X_2$ in the +X direction (the left side of FIG. 9) such that the tension $T_2$ of the second end portion 22 side becomes the target tension $T_{2e}$. By this operation, the torque is transmitted from the transmission portion BT to the rotator SF. At this time, $\Delta X_1$ satisfies [Equation 7]:

[Equation 7]

$$\begin{aligned}\Delta X1 &= (T_{1e} - T_c)/K \qquad (7)\\ &= (T_{1e} - T_{2e})/2K\\ &= T_{goal}/2K\end{aligned}$$

Figure 10:
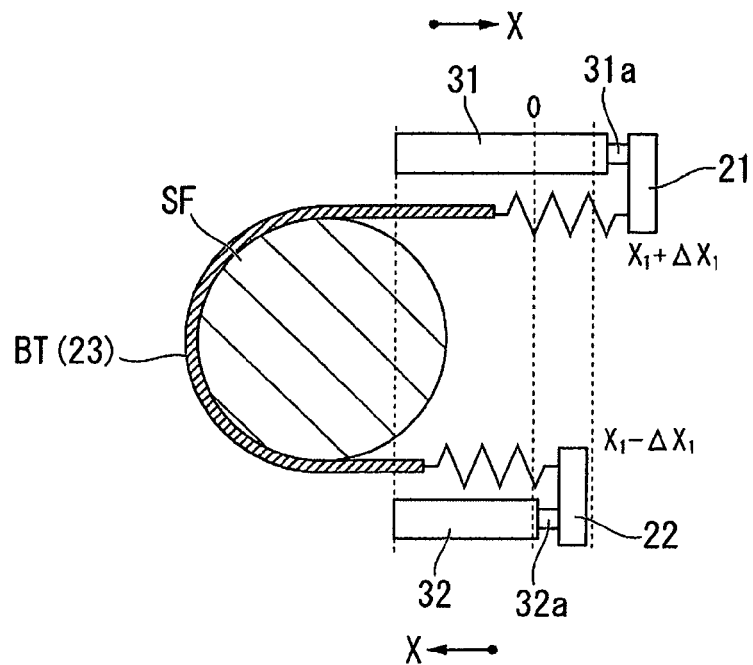
FIG. 10 is a diagram that shows an operation of a motor device according to the embodiment.

When the torque is transmitted from the transmission portion BT to the rotator SF, the rotator SF is rotated, and the elastic deformation of the transmission portion BT enters the same state as the initial state. As shown in FIG. 10, for this reason, the tension $T_1$ of the first end portion 21 side of the transmission portion BT and the tension $T_2$ of the second end portion 22 side of the transmission portion BT become the retention $T_c$ and are balance out. Since the effective tension at this time is substantially and linearly changed from $T_{goal}$ to zero, the effective tension, which is applied to the transmission portion BT, becomes $T_{goal}/2$. Furthermore, the torque to be transmitted to the rotator SF by the transmission portion BT becomes zero.

<Return Operation>

Figure 11:
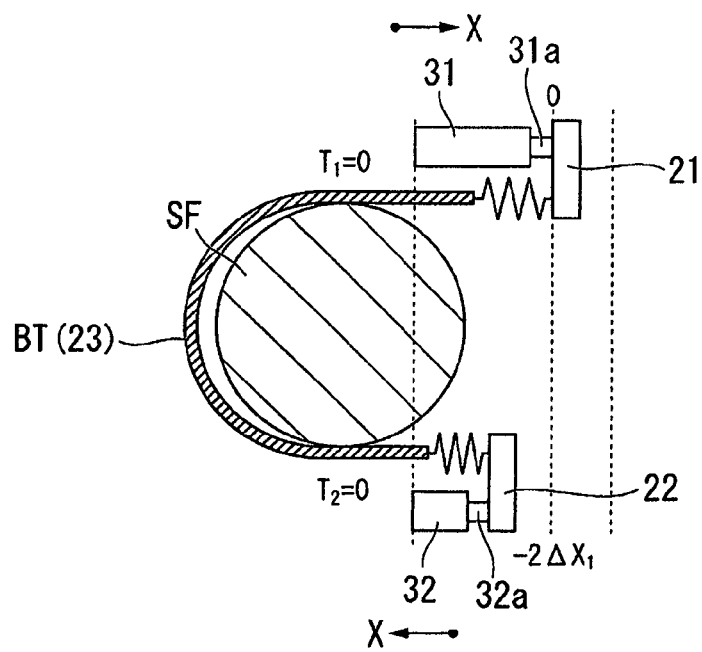
FIG. 11 is a diagram that shows an operation of a motor device according to the embodiment.

Next, as shown in FIG. 11, the control device CONT simultaneously deforms the driving element 31 and the driving element 32 so that first end portion 21 is moved up to the starting point position 0 and the second end portion 22 is moved from the starting point position 0 in the +X direction (a left side of FIG. 11). By simultaneously deforming the driving element 31 and the driving element 32, the transmission portion BT loosens (shortens) $2\Delta X_1$, with the result that a gap is generated between the transmission portion BT and the rotator SF. The rotator SF enters an inertial rotation state without receiving the frictional force by the transmission portion BT.

Figure 12:
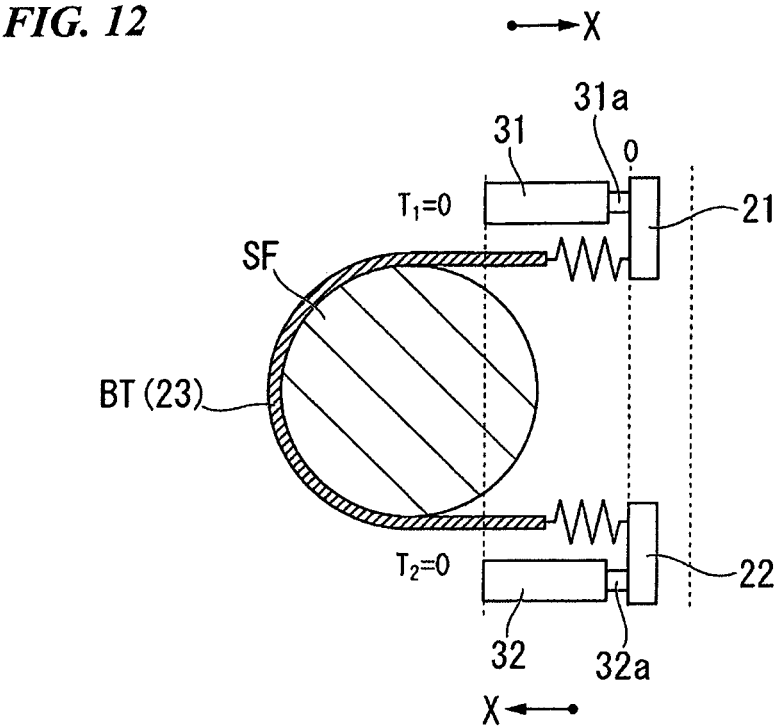
FIG. 12 is a diagram that shows an operation of a motor device according to the embodiment.

When the gap is generated between the transmission portion BT and the rotator SF, as shown in FIG. 12, the control device CONT deforms the driving element 32 so that without moving the first end portion 21 only the second end portion 22 returns to the starting point position 0. By this operation, the first end portion 21 and the second end portion 22 return to the starting point position 0. Even in this state, the rotator SF enters the inertial rotation state without receiving the frictional force by the transmission portion BT. In this manner, in the return operation, the first end portion 21 and the second end portion 22 are moved to the starting point position 0 in the state of rotating the rotator SF without giving the resistance due to the frictional force to the rotator SF.

<Driving Operation (Inertial Rotation State)>

The control device CONT detects an outer peripheral speed v of the rotator SF by a detector provided in the rotator SF. The control device CONT determines the movement distances of the first end portion 21 and the second end portion 22 based on the detection result. In the driving operation of the state in which the rotator SF is stopped, an initial position of the first end portion 21 is set as $X_1$ and an initial position of the second end portion 22 is set as $X_2$. When the same objective effective tension is added to the transmission portion BT in a state in which the rotator SF is in the inertial rotation, the same circumstances as the stopped state of the rotator SF are required. That is, there is a need to set a relative speed between the outer periphery of the rotator SF and the transmission portion BT to zero. For this reason, when determining the initial position of the first end portion 21 and the initial position of the second end portion 22, there is a need to consider the movement distance per a predetermined time of the outer periphery of the rotator SF. Specifically, the initial position of the first end portion 21 is set as $X_1+v\Delta t$, and the initial position of the second end portion 22 is set as $X_2-v\Delta t$. Herein, for example, $\Delta t$ includes a sampling time or the like of the control device CONT.

Figure 13:
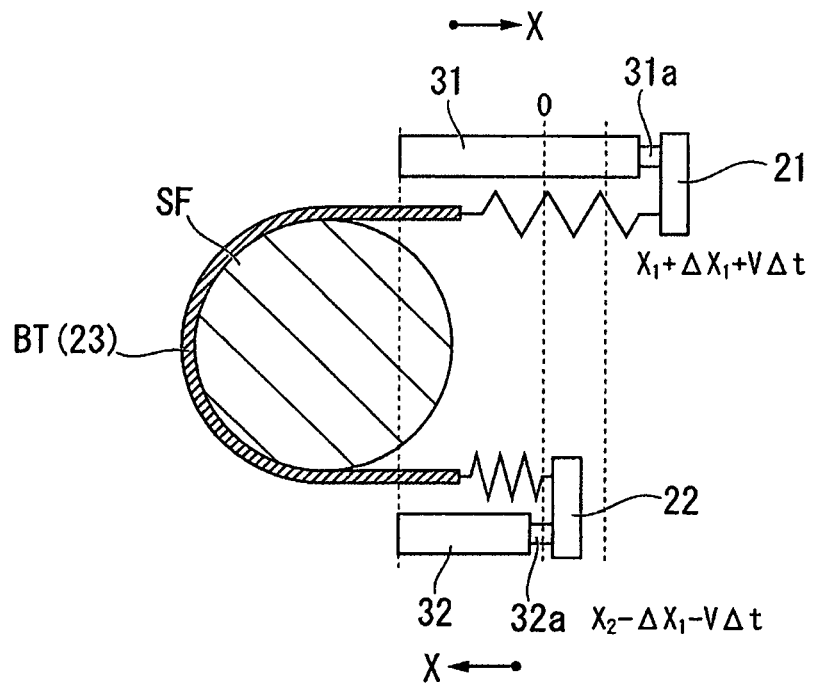
FIG. 13 is a diagram that shows an operation of a motor device according to the embodiment.
Figure 14:
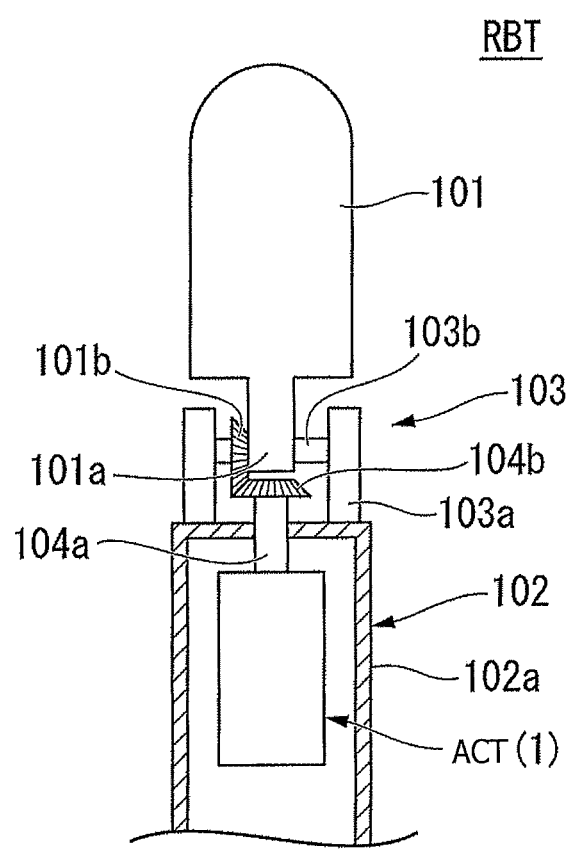
FIG. 14 is a diagram that shows a configuration of a robot hand according to embodiments of the present invention.

From this state, as shown in FIG. 13, the control device CONT deforms the driving element 31 and causes the first end portion 21 to move $\Delta X_1$ in the +X direction (the right side of FIG. 13) so that the tension $T_1$ of the first end portion 21 side of the transmission portion BT becomes the target tension $T_{1e}$. Furthermore, the control device CONT deforms the driving element 32 and causes the second end portion 22 to move $\Delta X_2$ in the +X direction (a left side of FIG. 13) so that the tension $T_2$ of the second end portion 22 side becomes the target tension $T_{2e}$. By this operation, the torque is transmitted from the transmission portion BT to the rotator SF. The first end portion 21 at this time is moved to $X_1+v\Delta t+\Delta X_1$ with respect to the starting point position 0 in the +X direction (for example, a right side of FIG. 13). Furthermore, the second end portion 22 at this time is moved to $X_2-v\Delta t-\Delta X_1$ with respect to the starting point position 0 in the −X direction (for example, a right side of FIG. 13).

<Return Operation>

Thereafter, the control device CONT simultaneously deforms the driving element 31 and the driving element 32 so that first end portion 21 is moved up to the starting point position 0 and the second end portion 22 is moved from the starting point position 0 in the +X direction (the left side of FIG. 11), and when the gap is generated between the transmission portion BT and the rotator SF, the control device CONT deforms the driving element 32 so that without moving the first end portion 21 only the second end portion 22 returns to the starting point position 0. By this operation, the first end portion 21 and the second end portion 22 return to the starting point position 0. The return operation can be performed as the same operation without depending on the rotational speed of the rotator SF.

Hereinafter, by repeating the driving operation and the return operation, the rotator SF can be rotated in the θZ direction. In a case where the rotator SF is in the inertial rotation state, by repeating the driving operation and the return operation unless the value of $X_1+v\Delta t +\Delta X_1$ exceed a maximum deformation amount of the driving element 31, it is possible to consecutively transmit the torque to the rotator SF.

Next, the torque control in the driving operation of the rotator SF of the present embodiment will be described.

An effective torque $N_e$ in the present embodiment depends on a time $t_{all}$ which is required for performing the driving operation and the return operation in one cycle, a time $t_e$ from the transmission starting of the effective tension to when the rotator SF enters the inertial state, depends on the objective effective tension $T_{goal}$, and a radius R of the rotator SF. Specifically, the following [Equation 8] is obtained:

$$N_e=R \cdot T_{goal} \cdot t_e/(2 \cdot t_{all}) \qquad \text{[Equation 8]}$$

As shown in [Equation 8], as parameters that control the efficient torque $N_e$, $t_{all}$, three parameters of t $t_e$ and $T_{goal}$ are adopted. In regard to the time $t_{all}$ of one cycle of the driving operation and the return operation, since there is a case where the driving control of the rotator SF is set to be regular, it is desirable to perform the control of the effective torque $N_e$ by changing the two values of $t_e$ and $T_{goal}$.

In this manner, according to the present embodiment, by setting the relative speed between the outer periphery of the rotator SF and the transmission portion BT to zero using the elastic deformation of the transmission portion BT and repeatedly performing the driving operation which transmits the effective tension of the transmission portion BT to the rotator SF and the return operation which simultaneously moves the first end portion 21 and the second end portion 22 to the inside, the rotator SF can be dynamically rotated while being accelerated or decelerated. Furthermore, it is possible to effectively rotate the rotator SF even in a small driving portion AC.

Third Embodiment

Next, a third embodiment of the present invention will be described based on the drawings.

Figure 18:
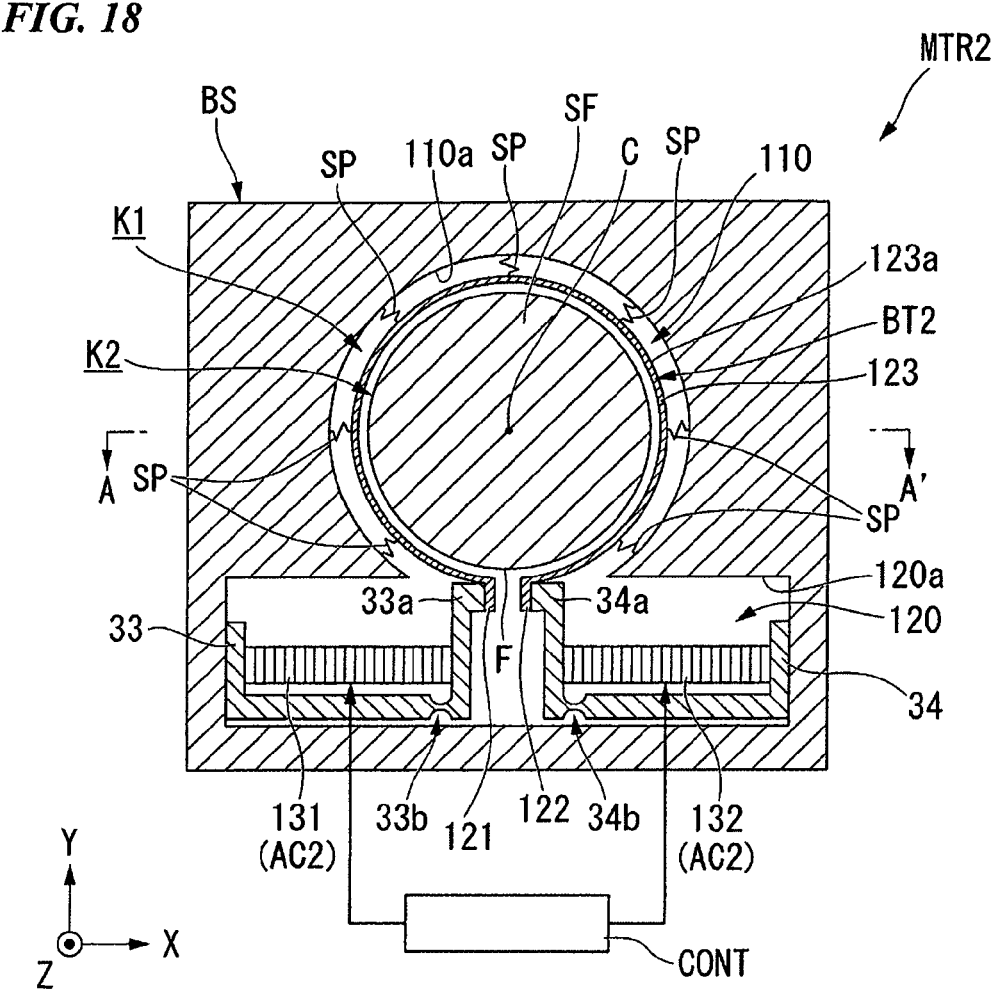
FIG. 18 is a diagram that shows a configuration of a motor device according to a third embodiment of the present invention.
Figure 19:
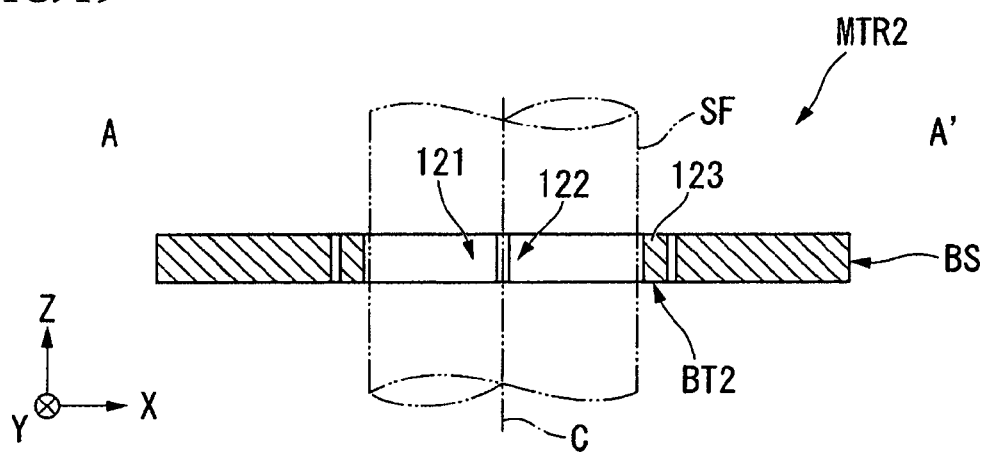
FIG. 19 is a diagram that shows a configuration of a motor device according to the embodiment.

FIG. 18 is a schematic configuration diagram that shows an example of a motor device MTR2 according to the present embodiment. FIG. 19 is a diagram that shows a configuration taken along section A-A' in FIG. 18.

As shown in FIGS. 18 and 19, the motor device MTR2 has a base portion BS, a transmission portion BT2, a driving portion AC2, and a control device CONT. The motor device MTR2 rotates a rotator SF using the driving portion AC2 and the transmission portion BT2. The rotator SF is adapted to rotate around a rotational axis (center axis) C.

Hereinafter, in the descriptions of the drawings, an XYZ orthogonal coordinate system is set, and the positional relationship of the members will be described while referring to the XYZ orthogonal coordinate system. A rotational axis direction of the rotator SF is set as the Z axis direction, orthogonal directions on a plane perpendicular to the Z axis direction are set as the X axis direction and the Y axis direction. Furthermore, rotation (slope) directions around the X axis, Y axis and Z axis are set as θX, θY and θZ directions, respectively.

The base portion BS is a portion that is formed in a plate shape using a material such as stainless steel. In the base portion BS, a penetration portion 110 and a penetration portion 120 are formed. The penetration portion 110 is an opening portion that is formed in substantially a circular shape when seen from a front surface, and is formed through both surfaces of the base portion BS. In the penetration portion 110, the transmission BT2 is disposed and the rotator SF is inserted therein.

The transmission portion BT2 has a first end portion 121, a second end portion 122 and a belt portion 123. The first end portion 121 and the second end portion 122 are formed, for example, so as to extend from a center portion in the X direction of the penetration portion 110 toward the -Y direction in parallel. The first end portion 121 and the second end portion 122 are disposed so as to interpose a standard position F on an outer periphery position of the rotator SF therebetween. In the present embodiment, a case will be described as an example where, for example, a -Y side end portion of the rotator SF in FIG. 18 is the standard position F.

The belt portion 123 is formed in a band shape, and is provided, for example, along an inner peripheral surface 110a of the penetration portion 110. The belt portion 123 is disposed so as to surround the rotator SF to be inserted into the penetration portion 110. In other words, the rotator SF is inserted into a space in the penetration portion 110 surrounded by the belt portion 123. The belt portion 123 is wound, for example, around at least part of the rotator SF.

Figure 20:
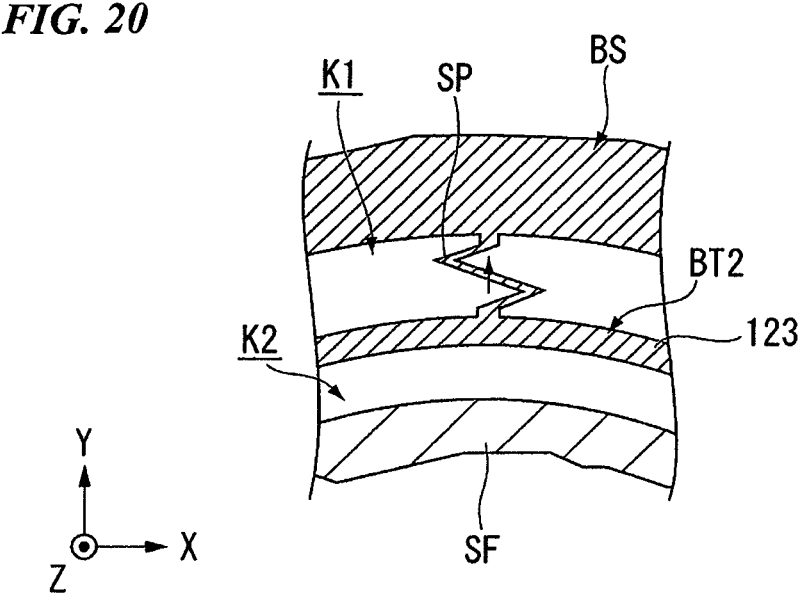
FIG. 20 is a diagram that shows a configuration of a part of a motor device according to the embodiment.

FIG. 20 is an enlarged view that shows part of the transmission portion BT2.

A gap K1 is formed between the belt portion 123 and the inner peripheral surface 110a of the penetration portion 110. An elastic member SP is disposed in the gap K1. The elastic member SP is formed, for example, in a linear shape, and one end thereof is connected to, for example, an outer peripheral surface 123a of the belt portion 123, and the other end thereof is connected to, for example, the inner peripheral surface 110a (the base portion BS). Multiple elastic members SP are provided in the extending direction of the belt portion 123. The elastic members SP are disposed, for example, at equal pitches. In the present embodiment, the elastic member SP, the base portion BS and the belt portion 123 are formed in one member, but the present invention is not limited to a configuration formed by the one member.

The elastic member SP is formed to have, for example, a plurality of bending portions between the belt portion 123 and the base portion BS. The elastic member SP has a configuration that gives the belt portion 123 an elastic force which is generated by the stretching or the shortening of the plurality of bending portions.

For this reason, the plurality of elastic members SP is formed and disposed to cause the elastic force to act in a direction where the belt portion 123 is separated from the rotator SF.

In the present embodiment, the elastic members SP are disposed so that the elastic force acts along a direction perpendicular to a tangential direction relative to a portion of the rotator SF contacting the belt portion 123. Of course, for example, if a direction where the belt portion 123 is separated from the rotator SF, other directions may be adopted without being limited thereto.

When the motor device MTR2 is not operated, the belt portion 123 is maintained by the plurality of elastic members SP so that a gap K2 is secured between the belt portion 123 and the rotator SF. When, for example, the vibration due to an external force is generated in the belt portion 123, the vibration is absorbed by the elastic member SP. In this manner, since the vibration in the belt portion 123 is suppressed, the occurrence of the vibration of the motor device MTR2 itself or the noise at the time of the operation of the motor device MTR2 is suppressed. In the present embodiment, since the elastic members SP are disposed along the extending direction of the belt portion 123 at substantially the same pitch, the vibration of the belt portion 123 is suppressed in the whole circumferential direction of the belt portion 123.

As shown in FIG. 18, for example, the penetration portion 120 is an opening portion, which is formed in substantially a rectangular shape when seen from the front thereof so as to partially overlap with a −Y side end portion of the penetration portion 25 110 and is formed through both surfaces of the base portion BS. The driving portion AC2 is disposed in the penetration portion 120. The driving portion AC2 is supported by the support members 33 and 34 provided in the inner peripheral surface 120a of the penetration portion 120.

The driving portion AC2 has a driving element (a first electromechanical conversion element) 131 and a driving element (a second electromechanical conversion element) 132 including an electromechanical conversion element such as a piezo element. The driving elements 131 and 132 have a configuration that is expanded and contracted and shortened in the X direction by the application of the voltage to the electromechanical conversion element. The control device CONT is connected to the driving portion AC2 and can supply the driving portion AC2 with the control signal.

The driving element 131 is supported by the support member 33. The position of the end portion of the −X side of the driving element 131 in the drawings is fixed. For this reason, the driving element 131 is expanded and contracted in the X direction, whereby the position of the end portion of the +X side thereof in the drawings is moved in the X direction. The end portion of the +X side of the driving element 131 is connected to the front end portion 33a of the support member 33. The front end portion 33a of the support member 33 is connected to, for example, the first end portion 121. The support member 33 has, for example, an expanding and contracting portion 33b more at the −X side than the front end portion 33a. The expanding and contracting portion 33b is expanded and contracted so that the front end portion 33a is moved together with the movement of the +X side end portion of the driving element 131.

The driving element 132 is supported by the support member 34. The position of the end portion of the +X side of the driving element 132 in the drawings is fixed. For this reason, the driving element 132 is expanded and contracted in the X direction, whereby the position of the end portion of the −X side in the drawings is moved in the X direction. The end portion of the −X side of the driving element 131 is connected to the front end portion 34a of the support member 34. The front end portion 34a of the support member 34 is connected to, for example, the second end portion 122. The support member 34 has, for example, a expanding and contracting portion 34b at the +X side of the front end portion 34a. The expanding and contracting portion 34b is expanded and contracted so that the front end portion 34a is moved together with the movement of the −X side end portion of the driving element 132.

The driving element 131 and the driving element 132 are provided in positions that interpose the first end portion 121 and the second end portion 122. The front end portion 33a of the support member 33 faces the first end portion 121, and the front end portion 34a of the support member 34 faces the second end portion 122. Thus, the front end portion 33a and the front end portion 34a are oppositely disposed.

When the driving element 131 is stretched in the +X direction and the driving element 132 is stretched in the −X direction, the first end portion 121 and the second end portion 122 approach each other. For this reason, the belt portion 123 is wound around the rotator SF, and the tension is applied to the belt portion 123. When the driving element 131 is shortened in the −X direction and the driving element 132 is shortened in the +X direction, the first end portion 121 and the second end portion 122 are separated from each other. For this reason, the belt portion 123 is separated and relaxed from the rotator SF.

Next, the driving operation of the rotator SF will be described.

In the motor device MTR2 according to the present embodiment, the principles of driving the rotator SF will be described. When driving the rotator SF, an effective tension is generated in the transmission portion BT2 wound around the rotator SF, and the torque is transmitted to the rotator SF by the effective tension.

When a tension T1 of the first end portion 121 side and a tension T2 of the second end portion 122 side of the transmission portion BT2 wound around the rotator SF satisfies the above-described [Equation 1] by Euler's frictional belt theory, the frictional force is generated between the transmission portion BT2 and rotator SF, and the transmission portion BT2 is moved together with the rotator SF in a state (a rotational force transmission state) in which the transmission portion BT2 does not slip with respect to the rotator SF. By this movement, the torque is transmitted to the rotator SF. However, in [Equation 1], $\mu$ is an external frictional coefficient between the transmission portion BT2 and the rotator SF, and $\theta$ is an efficient winding angle of the transmission portion BT2.

At this time, the effective tension contributing to the transmission of the torque is indicated by (T1−T2). When the effective tension (T1−T2) is obtained based on the above-described [Equation 1], the above-described [Equation 2] is provided. [Equation 2] is an equation that indicates the effective tension using T1.

From [Equation 2], it can be understood that the torque to be transmitted to the rotator SF is arbitrarily determined by the tension T1 of the driving element 131. A coefficient portion of T1 of the right side of [Equation 2] depends on the frictional coefficient $\mu$ between the transmission portion BT2 and the rotator SF and the efficient winding angle $\theta$ of the transmission portion BT2, respectively. FIG. 4 is a graph that shows a relationship between the efficient winding angle $\theta$ when the frictional coefficient $\mu$ is changed and the value of the coefficient portion. A transverse axis of the graph indicates the efficient winding angle $\theta$ and a longitudinal axis of the graph indicates the value of the coefficient portion.

As shown in FIG. 4, when the frictional coefficient $\mu$ is 0.3 and the efficient winding angle $\theta$ is greater than or equal to 300°, the value of the coefficient portion is greater than or equal to 0.8. From this, it is understood that, when the frictional coefficient $\mu$ is 0.3, by setting the efficient winding angle $\theta$ to be greater than or equal to 300°, a force of 80% or more of the tension T1 due to the driving element 131 contributes the torque of the rotator SF. In addition to the winding angle, from the graph of FIG. 4, it is estimated that the larger the frictional coefficient between the transmission portion BT2 and the rotator SF, the larger the value of the coefficient portion.

In this manner, it is understood that the size of the torque is arbitrarily determined by the tension T1 of the driving element 131 and is not related to, for example, the movement distance or the like of the transmission portion BT2. Thus, for example, a piezo element or the like used in the driving element 131 and the driving element 132 can generate the force of several hundreds of Newtons or more even in a small element of around several millimeters, and thus can give a very large rotational force.

Figure 21:
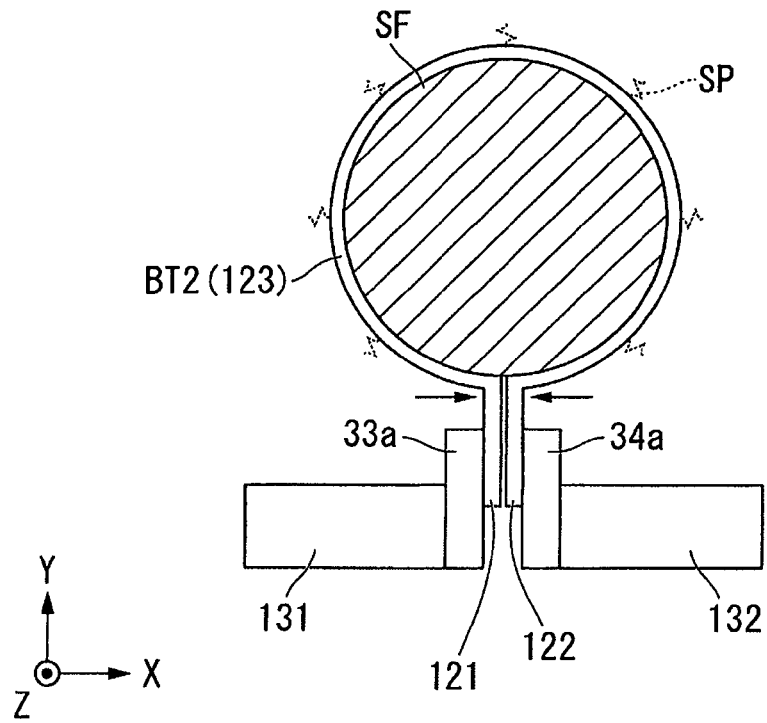
FIG. 21 is a diagram that shows an operation of a motor device according to the embodiment.

Based on the principle, as shown in FIG. 21, the control device CONT firstly deforms the driving element 131 and the driving element 132 so that the first end portion 121 is moved in the +X direction and the second end portion 122 is moved in the −X direction. By this operation, the tension T1 is generated in the first end portion side 121 of the transmission portion BT2, and the tension T2 is generated in the second end portion side 122 of the transmission portion BT2. Thus, the effective tension (T1−T2) is generated in the transmission portion BT2.

Figure 22:
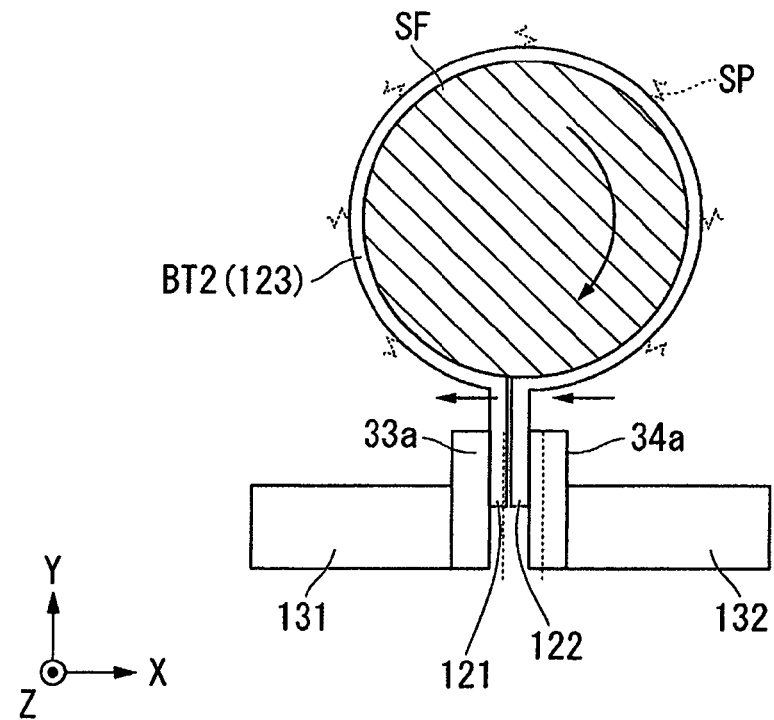
FIG. 22 is a diagram that shows an operation of a motor device according to the embodiment.

The control device CONT deforms the driving element 131 and the driving element 132 so that, as shown in FIG. 22, the first end portion 121 of the transmission portion BT2 is moved in the −X direction and the second end portion 122 is moved in the −X direction while maintaining the state of generating the effective tension in the transmission portion BT2 (a driving operation). In the operation, the control device CONT makes the movement distance of the first end portion 121 equal to the movement distance of the second end portion 122. By this operation, the transmission portion BT2 is moved in the state in which the frictional force is generated between the transmission portion BT2 and the rotator SF, and the rotator SF is moved in the θZ direction along with the movement.

In the present embodiment, the frictional coefficient μ between the transmission portion BT2 and the rotator SF is, for example, 0.3, and the transmission portion BT2 is wound around the rotator SF by substantially one rotation (360°). Thus, referring to the graph of FIG. 4, a force of about 85% of the tension T1 of the driving element 131 is transmitted to the rotator SF as the torque.

Figure 23:
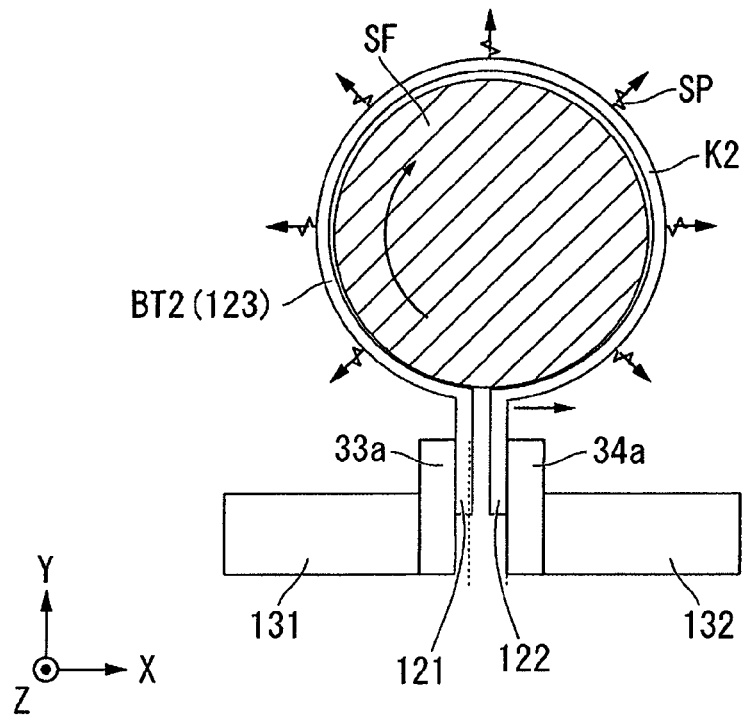
FIG. 23 is a diagram that shows an operation of a motor device according to the embodiment.

The control device CONT moves the first end portion 121 and the second end portion 122 by a predetermined distance, and then as shown in FIG. 23, deforms only the driving element 132 so that the second end portion 122 returns to a start position (a predetermined position) of the driving and the first end portion 121 is not moved. By this operation, the second end portion 122 is moved in the +X direction, and the winding of the transmission portion BT2 is loosened. That is, the effective tension applied to the transmission portion BT2 is released. In this state, the frictional force is not generated between the transmission portion BT2 and the rotator SF, and the rotator SF continues to rotate due to inertia.

For example, due to the assembly error of the transmission portion BT2 at the time of the assembling of the motor device MTR2, an imbalance of the strength distribution of the transmission portion BT2 or the like, there is a concern that, when the winding of the transmission portion BT2 is loosened, a state (a contact state), in which a gap does not exist between the transmission portion BT2 and the rotator SF, may occur. In this case, since the frictional force generated by the contact acts on the rotator SF in a direction opposite to an original rotational direction, torque may be reduced.

On the contrary, in the present embodiment, a configuration is provided in which the elastic member SP is provided in the outer peripheral surface 123a (FIG. 18) of the transmission portion BT2, and the elastic member SP acts the elastic force in a direction which separates the transmission portion BT2 from the rotator SF. When the winding of the transmission portion BT2 is loosened, the transmission portion BT2 is separated from the rotator SF by the elastic force of the elastic member SP. For this reason, a state is secured in which a gap K2 is formed between the transmission portion BT2 and the rotator SF, and the frictional force is not generated.

Figure 24:
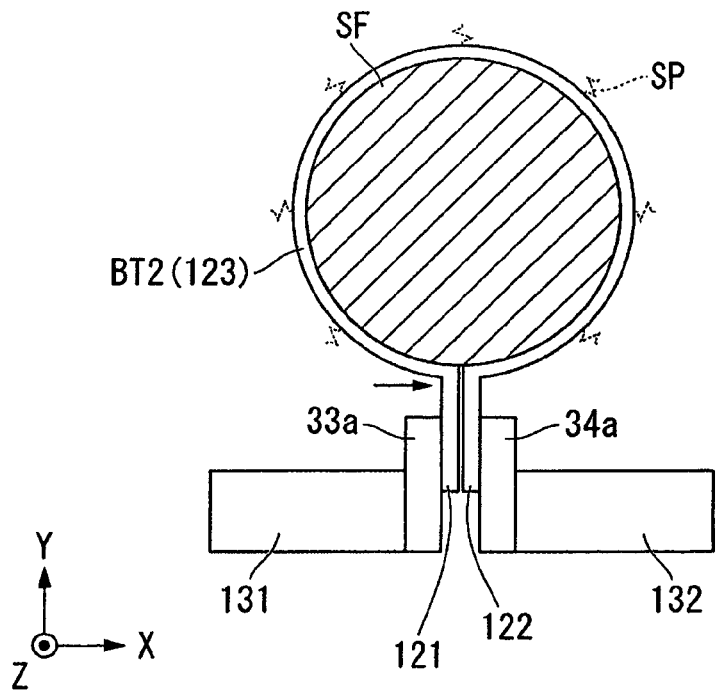
FIG. 24 is a diagram that shows an operation of a motor device according to the embodiment.

The control device CONT loosens the winding of the transmission portion BT2, and then, as shown in FIG. 24, deforms the driving element 131 so that the first end portion 121 returns to the start position (a predetermined position) of the driving. By this operation, in a state in which the winding of the transmission portion BT2 is loosened, that is, in a state in which the effective tension is not generated, the first end portion 121 of the transmission portion BT2 returns to the start position (a predetermined position) of the driving (a return operation).

Immediately before the first end portion 121 returns to the driving start position, the control device CONT deforms the driving element 132 and moves the second end portion 122 in the +X direction. By this operation, at substantially the same time as the first end portion 121 returns to the driving start position, the tension T2 is generated in the second end portion 122 side of the transmission portion BT2, and the tension T1 is generated in the first end portion 121 side of the transmission portion BT2. As a result, there is provided the same state (the state of FIG. 21) as the state in which the effective tension is added to the transmission portion BT2 at the time of the driving start.

After the effective tension is added to the transmission portion BT2, the control device CONT deforms the driving element 131 so that the first end portion 121 of the transmission portion BT2 is moved in the −X direction and deforms the driving element 132 so that the second end portion 122 is moved in the −X direction (driving operation). At this time, the movement distance of the first end portion 121 is made equal to the movement distance of the second end portion 122. By this operation, the transmission portion BT2 is moved in a state in which the frictional force is generated between the transmission portion BT2 and the rotator SF, and the rotator SF is rotated in the θZ direction together with the movement.

After that, the control device CONT releases the effective tension which is added to the transmission portion BT2 again. The control device CONT moves the transmission portion BT2 so that first end portion 121 and the second end portion 122 thereof return to the start position after releasing the effective tension (a return operation). In this manner, the control device CONT causes the driving operation and the return operation to be repeatedly performed in the driving portion AC2, whereby the rotator SF continues to rotate in the AZ direction.

Next, the manufacturing method of the motor device MTR2 will be described.

When manufacturing the motor device MTR2, firstly, the base portion BS, the elastic member SP and the transmission member BT2 are formed in a member. For example, a plurality of substrates is stacked, and the plurality of the substrates is arranged, cut, and formed. For example, a voltage is applied to a metallic linear member such as a wire and is electrically discharged, and a cutting process is performed on the substrates in a manner of a fretsaw, while causing relative movement between the wire and the substrates.

Furthermore, in addition to the above, molds of the base portion BS, the elastic member SP and the transmission portion BT2, which are formed in one member, may be formed and may be formed by casting. Furthermore, the substrates may be formed by extrusion molding using an extrusion mold of the base portion BS, the elastic member SP and the transmission portion BT2, which are formed in a member. Furthermore, the base portion BS, the elastic member SP and the transmission portion BT2 may be formed by patterning using a photolithography method. After forming the base portion BS, the elastic member SP and the transmission portion BT2 in one member, the driving portion AC2 is attached to the driving base portion BS, whereby the motor device MTR2 is completed.

In this manner, according to the present embodiment, since the driving portion AC2 performs the driving operation and the return operation in the state in which the transmission portion BT2 is wound around at least part of the rotator SF, by Euler's frictional belt theory, the torque is arbitrarily determined by one tension applied to transmission portion BT2. Thus, even when a reduction gear or the like is not attached, and even in a small driving portion AC2, it is possible to apply high torque to the rotator SF. As a result, it is possible to obtain a small motor device MTR2 capable of generating high torque. Furthermore, even in a small driving portion AC2, it is possible to rotate the rotator SF with high efficiency. Furthermore, according to the present embodiment, it is easy to control the torque of the motor device MTR2.

Furthermore, according to the present embodiment, since the elastic member SP is included which causes the elastic force to act in a direction separated from the rotator SF with respect to the belt portion 123 of the transmission portion BT2, a configuration is provided that easily secures the gap K2 between the rotator SF and the belt portion 123. As a result, a motor device MTR2 is provided that easily obtains torque between the belt portion 123 and the rotator SF.

Fourth Embodiment

Next, a fourth embodiment of the present invention will be described.

The present embodiment is different from the third embodiment in that an elastic deformation of the transmission portion BT2 is used at the time of the operation of the motor device MTR2. Thus, regarding a configuration of the motor device MTR2, it is possible to use the same configuration as the third embodiment except that the transmission portion BT2 is elastically deformable.

In the present embodiment, a spring constant of the transmission portion BT2 is set as k. Herein, by Euler's frictional belt theory, a retention $T_C$ of the rotator SF is set as the following [Equation 3]. The retention $T_C$ is the force that is needed to start to move the stopped rotator SF. Furthermore, if a target tension of the first end portion 121 side of the transmission portion BT2 is set as $T_{1e}$, a target tension of the second end portion 122 side of the transmission portion BT2 is set as $T_{2e}$, and an objective effective tension is set as $T_{goal}$, the above-described [Equation 4] and [Equation 5] are satisfied.

Hereinafter, the driving operation of the rotator SF will be described in priority based on FIGS. 25 to 30. In the present embodiment, in order to facilitate the description, the configuration of the motor device is schematically shown. Thus, for example, in a winding angle of the transmission portion BT2 or the like, there is difference from a real configuration in drawing.

In addition, in FIGS. 25 to 30, the description will be made such that, in the driving element 131 and the first end portion 121, the right side in the drawings is in the +X direction, and, in the driving element 132 and the second end portion 122, the left side in the drawings is in the +X direction.

In the following description, the positions of the first end portion 121 and the second end portion 122 of the transmission portion BT2, which enters the state in which transmission portion BT2 is wound around the rotator SF by one rotation without applying the tension to the transmission portion BT2, are set to a starting point position 0. Thus, in a state in which both the first end portion 121 and the second end portion 122 of the transmission portion BT2 are disposed in the starting point position 0, frictional force is not generated between transmission portion BT2 and the rotator SF.

<Driving Operation>

Figure 25:
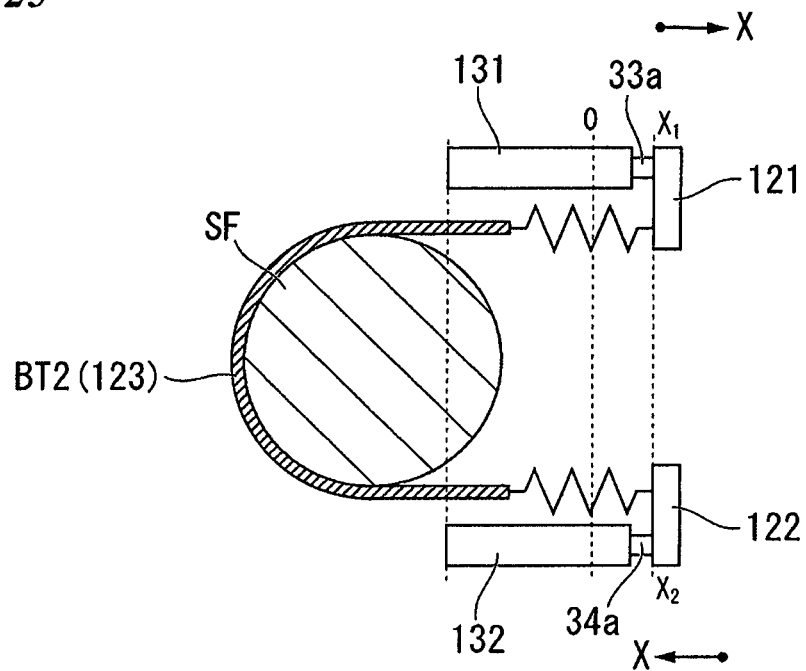
FIG. 25 is a diagram that shows an operation of a motor device according to a fourth embodiment of the present invention.

Firstly, as shown in FIG. 25, the control device CONT deforms the driving element 131 such that the first end portion 121 of the transmission portion BT2 is moved from the starting point position 0 to $X_1$ in the +X direction (a right side of FIG. 25). Furthermore, the control device CONT deforms the driving element 132 such that the second end portion 122 of the transmission portion BT2 is moved from the starting point position 0 to $X_2$ in the −X direction (a right side of FIG. 25). The state is called an initial state of the driving operation. At this time, $X_1$ and $X_2$ satisfy the above-described [Equation 6].

Figure 26:
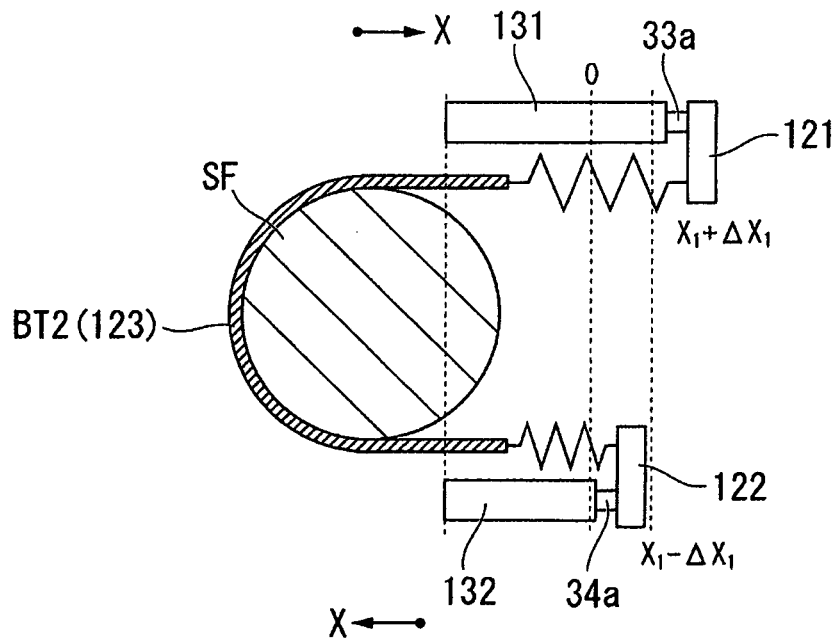
FIG. 26 is a diagram that shows an operation of a motor device according to the embodiment.
Figure 27:
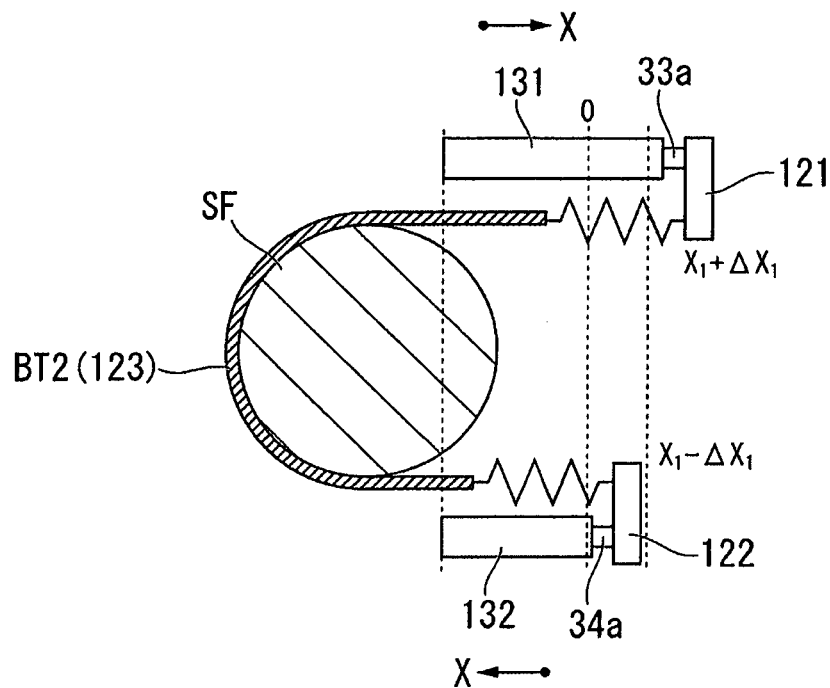
FIG. 27 is a diagram that shows an operation of a motor device according to the embodiment.

From this state, as shown in FIG. 26, the control device CONT deforms the driving element 131 and causes the first end portion 121 to move $\Delta X_1$ in the +X direction (the right side of FIG. 26) so that the tension $T_1$ of the first end portion 121 side of the transmission portion BT2 becomes the target tension $T_{1e}$. Furthermore, the control device CONT deforms the driving element 132 and causes the second end portion 122 to move $\Delta X_2$ in the +X direction (the left side of FIG. 26) such that the tension $T_2$ of the second end portion 122 side becomes the target tension $T_{2e}$. By this operation, the torque is transmitted from the transmission portion BT2 to the rotator SF. At this time, $\Delta X_1$ satisfies the above-described [Equation 7]:

When the torque is transmitted from the transmission portion BT2 to the rotator SF, the rotator SF is rotated, and the elastic deformation of the transmission portion BT2 enters the same state as the initial state. As shown in FIG. 27, for this reason, the tension $T_1$ of the first end portion 121 side of the transmission portion BT2 and the tension $T_2$ of the second end portion 122 side of the transmission portion BT2 become the retention $T_c$ and are balance out. Since the effective tension at this time is substantially and linearly changed from $T_{goal}$ to zero, the effective tension, which is applied to the transmission portion BT2, becomes $T_{goal}/2$. Furthermore, the torque to be transmitted to the rotator SF by the transmission portion BT2 becomes zero.

<Return Operation>

Figure 28:
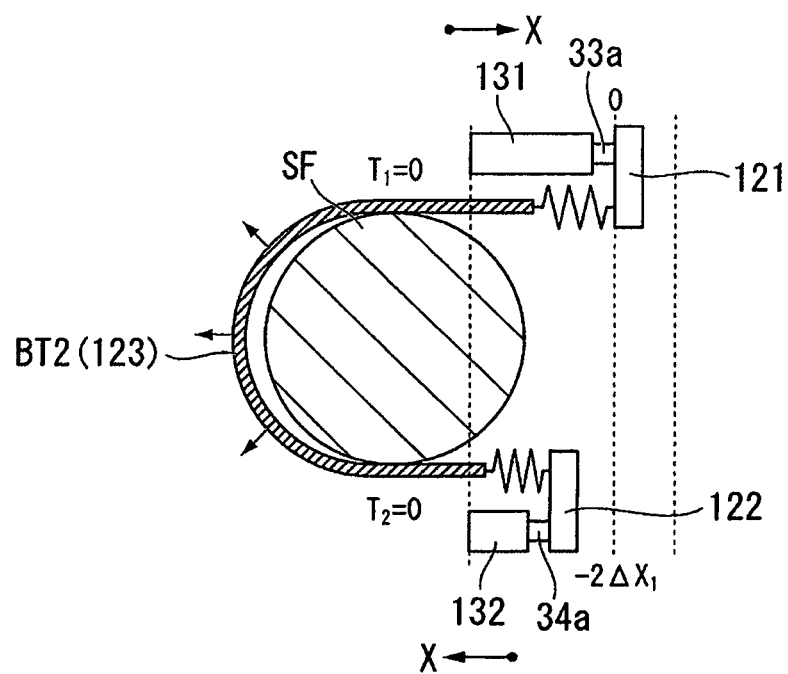
FIG. 28 is a diagram that shows an operation of a motor device according to the embodiment.

Next, as shown in FIG. 28, the control device CONT simultaneously deforms the driving element 131 and the driving element 132 such that first end portion 121 is moved up to the starting point position 0 and the second end portion 122 is moved from the starting point position 0 in the +X direction (a left side of FIG. 28). By simultaneously deforming the driving element 131 and the driving element 132, the transmission portion BT2 loosens $2\Delta X_1$, with the result that a gap is generated between the transmission portion BT2 and the rotator SF. Even in this case, similarly to the third embodiment, a gap is secured between the transmission portion BT2 and the rotator SF by the elastic force of the elastic member SP. The rotator SF enters an inertial rotation state without receiving the frictional force by the transmission portion BT2.

Figure 29:
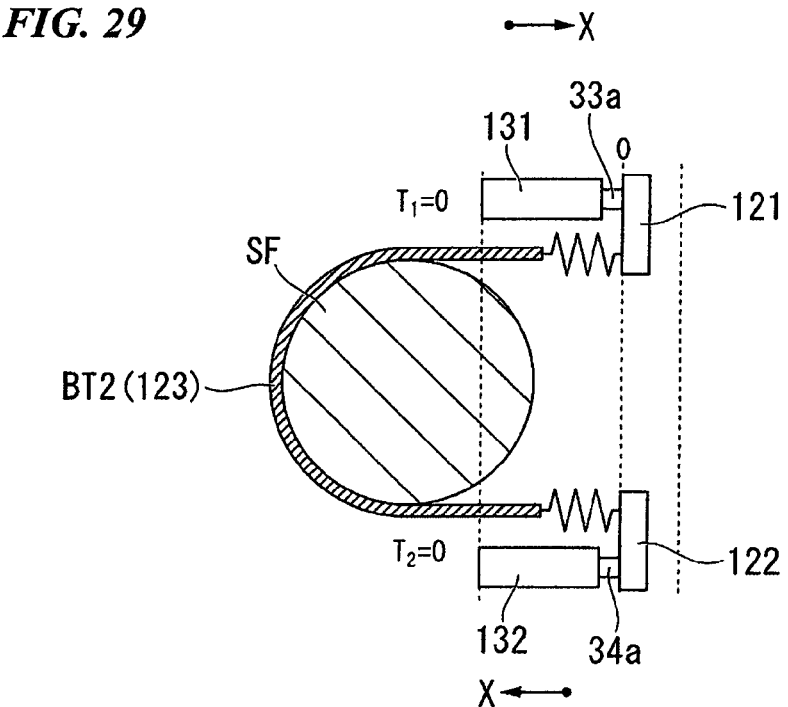
FIG. 29 is a diagram that shows an operation of a motor device according to the embodiment.

When the gap is generated between the transmission portion BT2 and the rotator SF, as shown in FIG. 29, the control device CONT deforms the driving element 132 so that without moving the first end portion 21 only the second end portion 122 returns to the starting point position 0. By this operation, the first end portion 121 and the second end portion 122 return to the starting point position 0. Even in this state, the rotator SF enters the inertial rotation state without receiving the frictional force by the transmission portion BT2. In this manner, in the return operation, the first end portion 121 and the second end portion 122 are moved to the starting point position 0 in the state of rotating the rotator SF without giving the resistance due to the frictional force to the rotator SF.

<Driving Operation (Inertial Rotation State)>

The control device CONT detects an outer peripheral speed v of the rotator SF by a detector provided in the rotator SF. The control device CONT determines the movement distances of the first end portion 121 and the second end portion 122 based on the detection result. In the driving operation of the state in which the rotator SF is stopped, an initial position of the first end portion 121 is set as $X_1$ and an initial position of the second end portion 122 is set as $X_2$. When the same objective effective tension is added to the transmission portion BT2 in a state in which the rotator SF is in the inertial rotation, the same circumstances as the stopped state of the rotator SF are required. That is, there is a need to set a relative speed between the outer periphery of the rotator SF and the transmission portion BT2 to zero. For this reason, when determining the initial position of the first end portion 121 and the initial position of the second end portion 122, there is a need to consider the movement distance per a predetermined time of the outer periphery of the rotator SF. Specifically, the initial position of the first end portion 121 is set as $X_1+v\Delta t$, and the initial position of the second end portion 122 is set as $X_2-v\Delta t$. Herein, for example, $\Delta t$ includes a sampling time or the like of the control device CONT.

Figure 30:
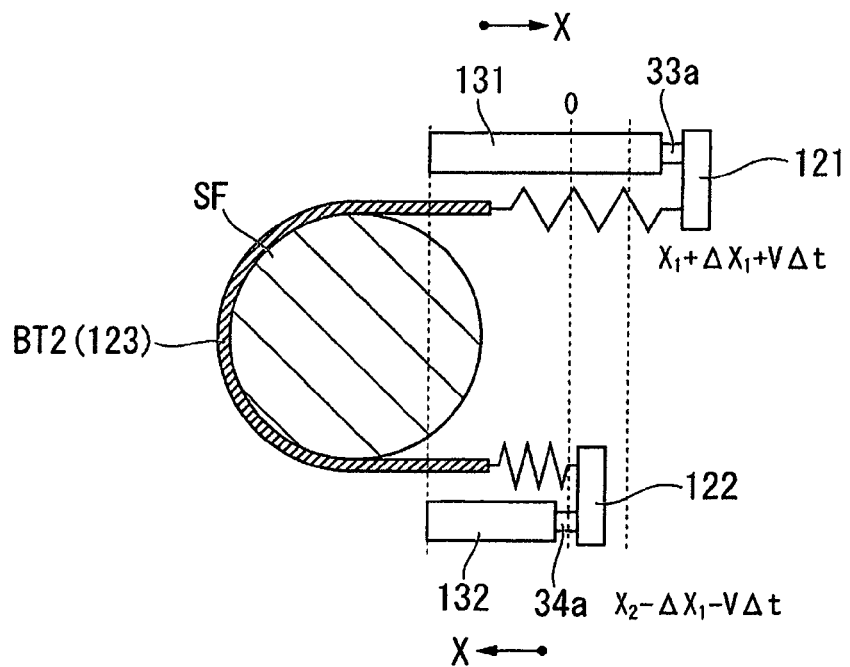
FIG. 30 is a diagram that shows an operation of a motor device according to the embodiment.

From this state, as shown in FIG. 30, the control device CONT deforms the driving element 131 and causes the first end portion 121 to move $\Delta X_1$ in the +X direction (the right side of FIG. 30) so that the tension T1 of the first end portion 121 side of the transmission portion BT2 becomes the target tension $T_{1e}$. Furthermore, the control device CONT deforms the driving element 132 and causes the second end portion 122 to move $\alpha X_2$ in the +X direction (the left side of FIG. 30) so that the tension T2 of the second end portion 122 side becomes the target tension $T_{2e}$. By this operation, the torque is transmitted from the transmission portion BT2 to the rotator SF. The first end portion 121 at this time is moved to $X_1+v\Delta t+\Delta X_1$ with respect to the starting point position 0 in the +X direction (for example, a right side of FIG. 29). Furthermore, the second end portion 122 at this time is moved to $X_2-v\Delta t-\Delta X_1$ with respect to the starting point position 0 in the −X direction (for example, the right side of FIG. 30).

<Return Operation>

Thereafter, the control device CONT simultaneously deforms the driving element 131 and the driving element 132 so that first end portion 121 is moved up to the starting point position 0 and the second end portion 122 is moved from the starting point position 0 in the +X direction (the left side of FIG. 28), and when the gap is generated between the transmission portion BT2 and the rotator SF, the control device CONT deforms the driving element 132 so that without moving the first end portion 121 only the second end portion 122 returns to the starting point position 0. By this operation, the first end portion 121 and the second end portion 122 return to the starting point position 0. The return operation can be performed as the same operation without depending on the rotational speed of the rotator SF.

Hereinafter, by repeating the driving operation and the return operation, the rotator SF can be rotated. In a case where the rotator SF is in the inertial rotation state, by repeating the driving operation and the return operation unless the value of $X_1+v\Delta t+\Delta X_1$ exceed a maximum deformation amount of the driving element 131, it is possible to consecutively transmit the torque to the rotator SF.

Next, the torque control in the driving operation of the rotator SF of the present embodiment will be described.

An effective torque $N_e$ in the present embodiment depends on a time $t_{all}$ which is required for performing the driving operation and the return operation in one cycle, a time $t_e$ from the transmission starting of the effective tension to when the rotator SF enters the inertial state, depends on the target effective tension $T_{goal}$, and a radius R of the rotator SF. Specifically, the above-described [Equation 8] is obtained:

As shown in [Equation 8], as parameters that control the efficient torque $N_e$, three parameters of $t_{all}$, $t_e$ and $T_{goal}$ are adopted. In regard to the time $t_{all}$ of one cycle of the driving operation and the return operation, since there is a case where the driving control of the rotator SF is set to be regular, it is desirable to perform the control of the effective torque $N_e$ by changing the two values of $t_e$ and $T_{goal}$.

In this manner, according to the present embodiment, by setting the relative speed between the outer periphery of the rotator SF and the transmission portion BT2 to zero using the elastic deformation of the transmission portion BT2 and repeatedly performing the driving operation which transmits the effective tension of the transmission portion BT2 to the rotator SF and the return operation which simultaneously moves the first end portion 121 and the second end portion 122 to the inside, the rotator SF can dynamically be rotated while being accelerated or decelerated. Furthermore, it is possible to effectively rotate the rotator SF even in a small driving portion AC2.

Fifth Embodiment

Next, a fifth embodiment of the present invention will be described.

Figure 31:
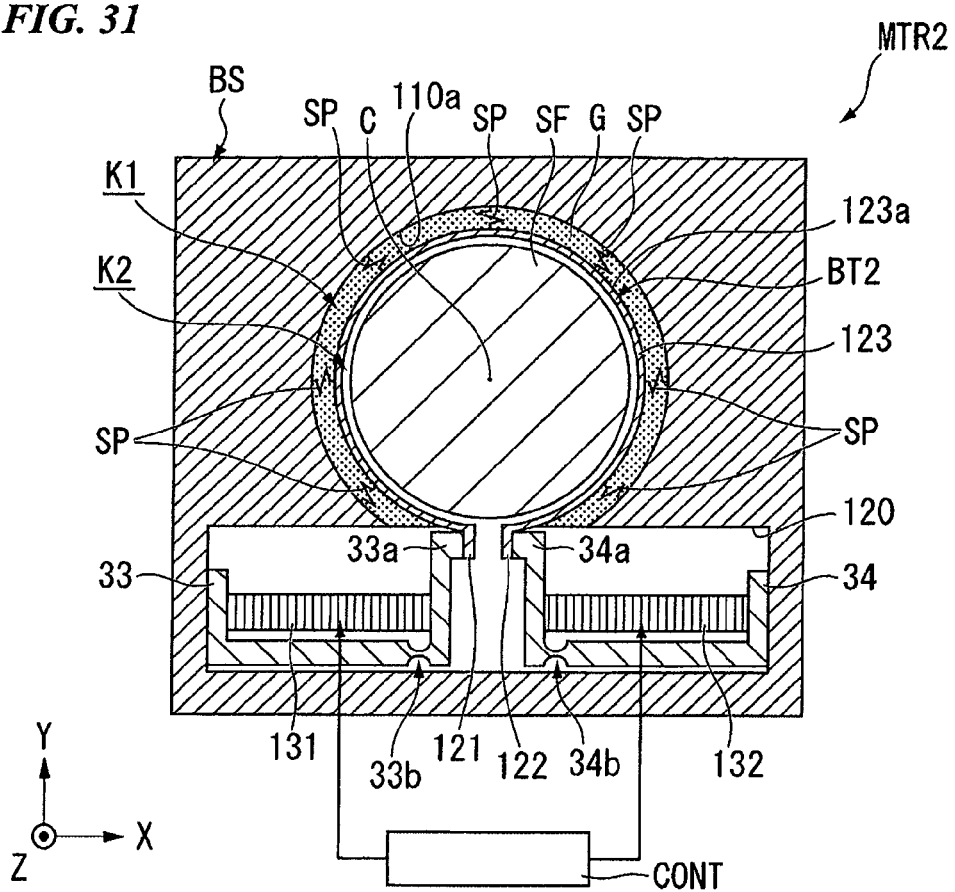
FIG. 31 is a diagram that shows an operation of a motor device according to a fifth embodiment of the present invention.

FIG. 31 is a diagram that shows a configuration of the motor device MTR2 according to the present embodiment. The motor device MTR2 according to the present embodiment is different from the embodiments in that an elastic body G is provided between the transmission portion BT2 and the base portion BS, and other configurations thereof are the same as those of the embodiments.

Figure 32:
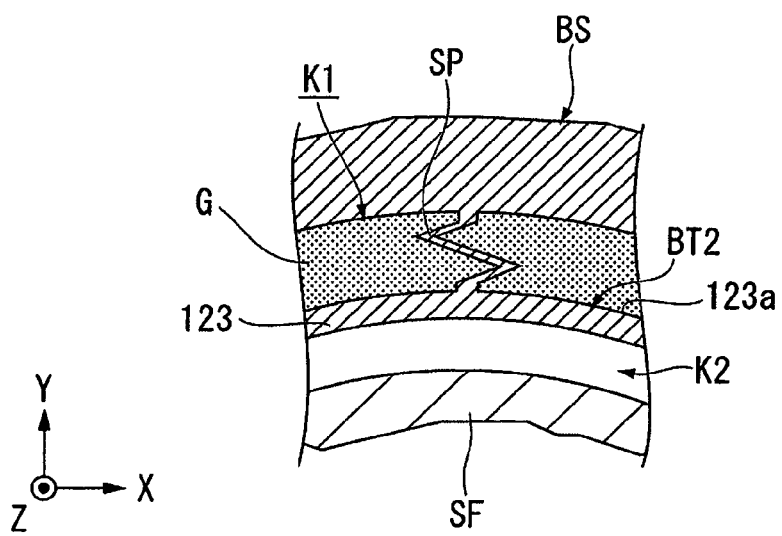
FIG. 32 is a diagram that shows a configuration of part of a motor device according to the embodiment.

As shown in FIGS. 31 and 32, the elastic body G is provided so as to be embedded between the belt portion 123 of the transmission portion BT2 and the base portion BS and is bonded to the belt portion 123 and the base portion BS. The elastic body G is disposed in the gap K1 between the outer peripheral surface 123a of the belt portion 123 and the inner peripheral surface 110a of the penetration portion 110. The elastic body G is disposed around the elastic member SP in the same gap K1 as the elastic member SP.

As the elastic body G, for example, a material of a gel phase such as silicone rubber. The elastic body G and elastic member SP cause the elastic force to act on the belt portion 123 in a direction separated from the rotator SF. Since the elastic body G is disposed on substantially the whole outer peripheral surface 123a of the belt portion 123, the elastic force evenly acts on the whole belt portion 123. Furthermore, the vibration applied to the transmission portion BT2 is evenly absorbed in the circumferential direction of the transmission portion BT2. Furthermore, since the elastic body G is disposed on substantially the whole outer peripheral surface 123a of the belt portion 123, the noise generated from the motor device MTR2 is evenly absorbed in the circumferential direction of the transmission portion BT2 by the elastic body G.

The elastic body G of the gel phase is disposed between the transmission portion BT2 and the base portion BS, for example, without a gap. For this reason, it is possible to conduct, for example, the heat between the transmission portion BT2 and the base portion BS via the elastic body G. The heat generated by the friction between the transmission portion BT2 and the rotator SF is transmitted to the base portion BS by the elastic body G. Thus, the transmission portion BT2 is effectively cooled.

According to the present embodiment, by charging the elastic body G having the adhering ability to the gap K1, it is possible to cause the elastic force to act evenly on a portion of the belt portion 123 where the elastic body SP is not provided.

In addition, in the present embodiment, the elastic body G is disposed in the whole gap K1 formed between the belt portion 123 and the base portion BS, but the present invention is not limited thereto. For example, the elastic body G may be disposed in part of the gap K1.

Furthermore, in the present embodiment, a configuration has been described as an example in which the elastic member SP is provided between the belt portion 123 and the base portion BS and then the elastic body G is disposed, but the present invention is not limited thereto.

For example, the elastic member SP may not be provided in the gap K1, and there may be a configuration where only the elastic body G is disposed in the gap K1.

In this case, by disposing the elastic body G in substantially the whole gap K1, it is possible to cause the elastic force to evenly act on the belt portion 123. Furthermore, in this case, since it is possible to make the distance between the belt portion 123 and the base portion BS uniform in the whole gap K1, the gap K2 between the transmission portion BT2 and the rotator SF can be secured with high accuracy.

In addition, a decision that both the elastic member SP and the elastic body G are disposed, only the elastic body G of the gel phase is used, or only the elastic member SP is disposed can be suitably selected depending on the shape, the weight or the like of the belt portion 123.

Sixth Embodiment

Next, a sixth embodiment of the present invention will be described.

Figure 17:
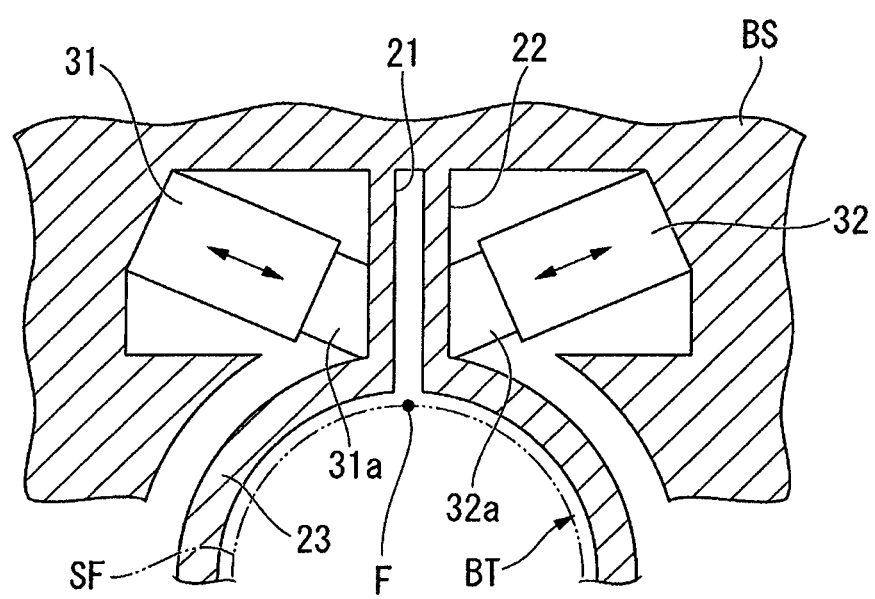
FIG. 17 is a diagram that shows another embodiment of a motor device according to the first and second embodiments of the present invention.

FIG. 17 is a diagram that shows a configuration of part (a front end of a finger portion) of a robot device RBT which includes the motor device MTR or MTR2 described in any one of the above-mentioned embodiments.

As shown in FIG. 17, the robot device RBT has a configuration which includes a distal joint portion 101, a middle joint portion 102 and an articulation portion 103, and the distal joint portion 101 and the middle joint portion 102 are connected to each other via the articulation portion 103. In the articulation portion 103, a shaft support portion 103a and a shaft portion 103b are provided. The axial support portion 103a is fixed to the middle joint portion 102. The shaft portion 103b is supported in a state of being fixed to the shaft support portion 103a.

The distal joint portion 101 has a connection portion 101a and a gear 101b. The shaft portion 103b of the articulation portion 103 penetrates the connection portion 101a, and the distal end portion 101 can rotate using the shaft portion 103b as a rotational shaft. The gear 101b is a bevel gear which is fixed to the connection portion 101a. The connection portion 101a is integrally rotated with the gear 101b.

The middle joint portion 102 has a case 102a and a driving device ACT. The driving device ACT can use the motor device MTR or MTR2 described in the above-mentioned embodiments. The driving device ACT is provided in the case 102a. A rotational shaft member 104a is attached to the driving device ACT. A gear 104b is provided in the front end of the rotational shaft member 104a. The gear 104b is a bevel gear that is fixed to the rotational shaft member 104a. The gear 104b is engaged with the gear 101b.

In the robot device RBT configured as above, the rotational shaft member 104a is rotated by the driving of the driving device ACT, and the gear 104b is integrally rotated with the rotational shaft member 104a. The rotation of the gear 104b is transmitted to the gear 101b engaged with the gear 104b, whereby the gear 101b is rotated. By the rotation of the gear 101b, the connection portion 101a is rotated, whereby the distal joint portion 101 is rotated around the shaft portion 103b.

In this manner, according to the present embodiment, by mounting the driving device ACT which can output the rotation of a low speed and high torque at a low voltage, the distal joint portion 101 can directly be rotated without using, for example, a reduction gear. Furthermore, in the present embodiment, since the driving device ACT is driven in a non-resonance configuration, it is possible to configure the majority of parts by a light material such as a resin.

The technical scope of the present invention is not limited to the above-mentioned embodiments, but can be suitably changed within a scope which does not depart from the gist of the present invention.

Figure 15:
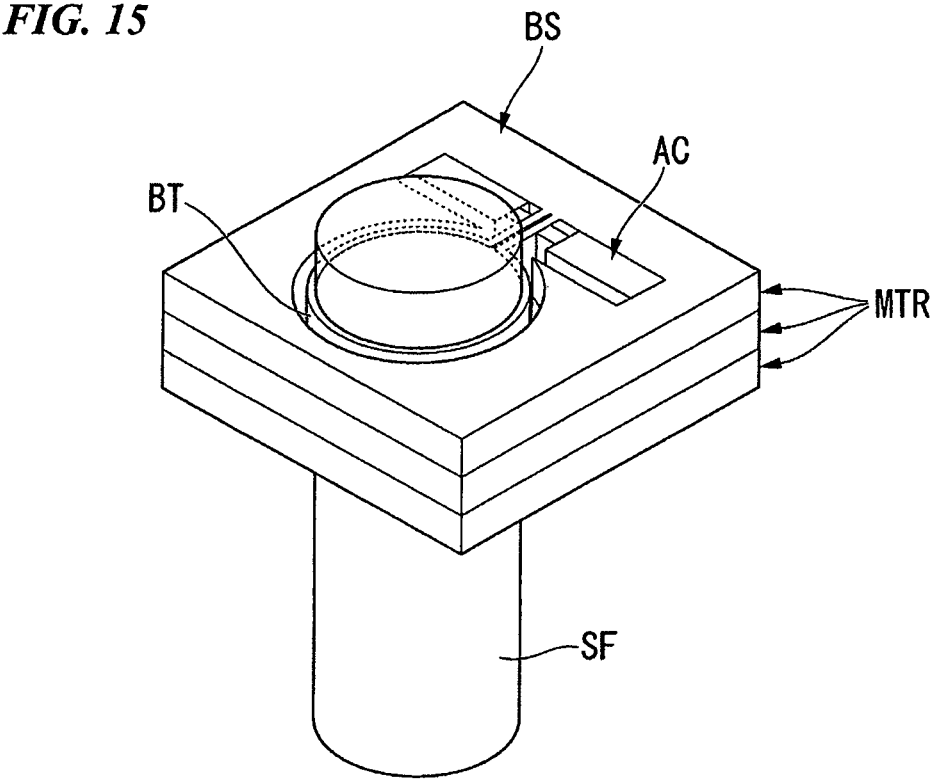
FIG. 15 is a diagram that shows another configuration of a motor device according to embodiments of the present invention.

For example, in the respective embodiments, a case has been described as an example in which the motor device MTR is provided only in one phase, but the present invention is not limited thereto, for example, a configuration may be adopted in which the motor device MTR of multiple phases is used. For example, in the configuration shown in FIG. 15, there is a three phases structure in which three motor devices MTR are provided along the rotational axis direction of the rotator SF. Thus, it is possible to sequentially drive the three phases transmission portion BT and the driving portion AC of the three phases for each phase. In this manner, in the case of alternately performing the driving in three phases, the vibration width of the tension is suppressed to a minimum, whereby stable driving can be performed. For example, the motor device MTR in the present embodiment may have a configuration including two base portions BS (the base portion BS and a second base portion) in the above-mentioned embodiment, and may have a configuration including three base portions BS (the base portion BS, a second base portion and a third base portion) in the above-mentioned embodiment.

Moreover, for example, in the above-mentioned embodiments, the configuration in which the rotator SF is a solid has been described, but, for example, the present invention can be applied to a case of using a rotator that is formed in a hollow form (for example, a cylindrical shape). Particularly, like the sixth embodiment, in a case where the motor device MTR is mounted on the robot device RBT (for example, the head of the finger portion thereof, the evolution system machine or the like), a wiring or the like can be disposed inside the cylindrical rotator SF.

Figure 16:
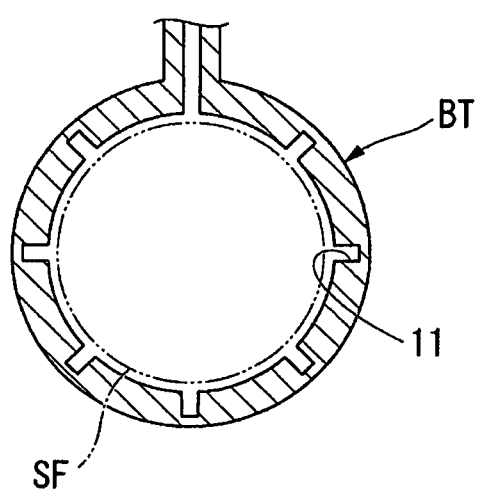
FIG. 16 is a diagram that shows another embodiment of a motor device according to the first and second embodiments of the present invention.

Furthermore, in the above-mentioned embodiment, a configuration has been described as an example in which the cutting portion 11 is provided outside the transmission portion BT, but, without being limited thereto, a configuration may be adopted in which, for example, as shown in FIG. 16, a notch portion is provided inside (a surface contacting the rotator SF) the transmission portion BT.

Furthermore, of course, a configuration may be adopted in which the cutting portion 11 is not provided.

Furthermore, in the above-identified embodiments, the configuration has been described as an example in which the front end portion 31a of the driving element 31 faces the front end portion 32a of the driving element 32 and the driving element 31 and the driving element 32 are extended and contracted in the X direction in parallel, but the present invention is not limited thereto. For example, as shown in FIG. 17, a configuration may be adopted in which the front end portion 31a of the driving element 31 and the front end portion 32a of the driving element 32 are attached so as to slope to the rotator SF side. In this case, the driving element 31 and the driving element 32 are deformed to the inside (the rotator SF side) from the tangential direction on the standard position F of the rotator SF.

Furthermore, For example, in the above-mentioned embodiments, a configuration was described as an example in which the elastic member SP is formed on the outer peripheral surface 123a of the belt portion 123. However, the present invention is not limited thereto, for example, a configuration may be adopted in which the elastic member SP is formed on the inner peripheral surface (a surface that comes into contact with the rotator SF) of the belt portion 123.

Figure 33A:
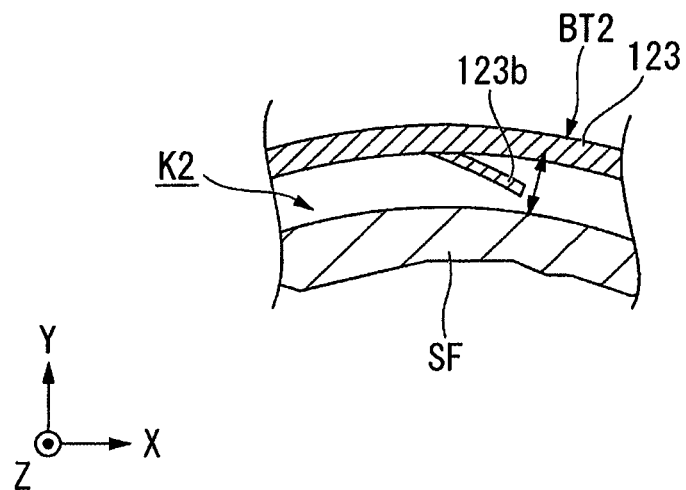
FIG. 33A is a diagram that shows another embodiment of a motor device according to the third, fourth and fifth embodiments of the present invention.
Figure 33B:
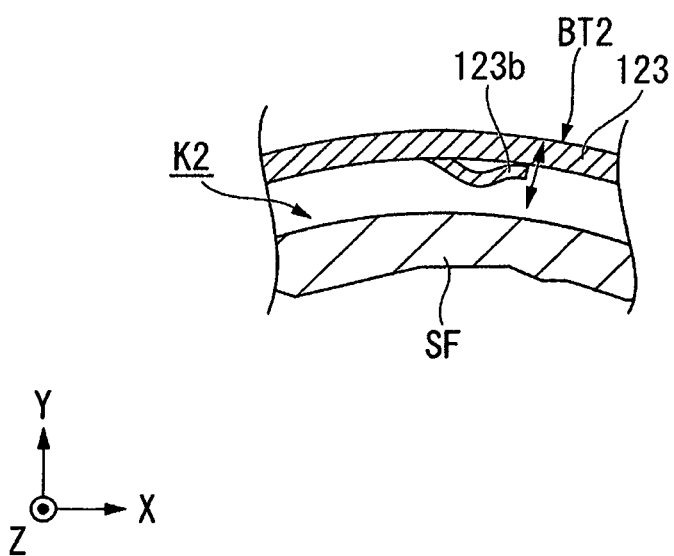
FIG. 33B is a diagram that shows another embodiment of a motor device according to the third, fourth and fifth embodiments of the present invention.

Furthermore, for example, as shown in FIG. 33A, a configuration can be adopted in which a portion of the belt portion 123 protrudes toward the rotator SF. In this configuration, the protrusion portion 23b can cause the elastic force to act on the belt portion 123 like a flat spring by a reaction between the protrusion portion 23b of the belt portion 123 and the rotator SF. In addition, as shown in FIG. 33B, a configuration may be adopted in which a bending portion is formed in the protrusion portion 23b and the bending portion is brought into contact with the rotator SF.

Furthermore, for example, in the embodiments, a case has been described as an example in which the motor device MTR2 is provided only in one phase, but the present invention is not limited thereto, for example, a configuration may be adopted in which the motor device MTR2 of multiple phases is used. For example, it is possible to adopt a three phases structure in which three motor devices MTR2 are provided along the rotational axis direction of the rotator SF, and the three phases transmission portion BT2 and the driving portion AC2 can be sequentially driven for each phase. In this manner, in the case of alternately performing the driving in three phases, the vibration width of the tension is suppressed to a minimum, whereby stable driving can be performed.

Moreover, for example, in the above-mentioned embodiments, the configuration (a configuration that is not hollow) where the rotator SF is a solid has been described, but, for example, the present invention can be applied to a case of using a hollow rotor such as a rotator, for example, formed in a cylindrical shape, without being limited thereto. Particularly, like the sixth embodiment, in a case where the motor device MTR2 is mounted on the robot device RBT (for example, the head of the finger portion thereof, the evolution system machine or the like), a wiring or the like can be disposed inside the cylindrical rotator SF. Of course, the rotator SF may be hollow in other cases without being limited to the case of mounting the motor device MTR2 on the robot device RBT.

Furthermore, in the above-mentioned embodiment, a case has been described as an example in which the base portion BS is formed in a rectangular shape when seen from the front thereof, but other shapes may be adopted without being limited thereto. For example, a circle or an oval may be adopted, and other shapes may be adopted such as a trapezoid, a parallelogram, a lozenge, a triangle, a pentagon, and a hexagon.

Furthermore, in the above-mentioned embodiments, the configuration has been described as an example in which the front end portion 33a of the support member 33 faces the front end portion 34a of the support member 34, and the driving element 131 and the driving element 132 are expanded and contracted in the X direction in parallel, but the present invention is not limited thereto. For example, a configuration may be adopted in which the front end portion 33a of the support member 33 and the front end portion 34a of the support member 34 are attached so as to slope to the rotator SF side. In this case, the driving element 131 and the driving element 132 are deformed to the inside (the rotator SF side) from the tangential direction on the standard position F of the rotator SF.

Furthermore, as a shape of the belt portion 123, in the above-mentioned embodiments, the belt portion 123 formed in the shape of a band has been described as an example, but another shape such as a linear shape or a chain shape may be adopted without being limited thereto.

What is claimed is:

1. A motor device comprising:
   a base portion;
   a transmission portion that is formed with the base portion as one member and is wound around at least a part of an outer periphery of a rotator, the transmission portion and the base portion being formed in one plate shape member; and
   a driving portion which is supported by the base portion, moves the transmission portion by a certain distance in a state in which a rotational force is transmitted between the rotator and the transmission portion, and returns the transmission portion to a predetermined position in a state in which the rotation force transmission state is released.

2. The motor device according to claim 1,
   wherein the base portion has a penetration portion that surrounds the rotator, and
   wherein the transmission portion is provided in the penetration portion.

3. The motor device according to claim 1,
   wherein the base portion has a connection portion that is fixed in a predetermined position separated from the rotator.

4. The motor device according to claim 1,
   wherein the transmission portion is formed in an elastically deformable manner.

5. The motor device according to claim 1,
   wherein the transmission portion is formed in a band shape.

6. The motor device according to claim 1,
   wherein the transmission portion has at least one cut portion.

7. The motor device according to claim 6,
   wherein a plurality of cut portions is provided all over the transmission portion separated by substantially equal distances.

8. The motor device according to claim 1,
   wherein the transmission portion has one end portion and another end portion that are connected to the base portion, and
   wherein the driving portion has a pair of electromechanical conversion elements that are connected to the one end portion and the other end portion.

9. The motor device according to claim 8,
   wherein the one end portion and the other end portion are disposed in positions that interpose a standard position on the outer periphery of the rotator therebetween, and
   wherein the pair of the electromechanical conversion elements are provided in positions that interpose the one end portion and the other end portion therebetween.

10. The motor device according to claim 9,
wherein the pair of the electromechanical conversion elements are disposed so as to be deformed toward a center side of the rotator from a tangential direction of the rotator in the standard position.

11. The motor device according to claim 1,
wherein the rotator is configured in a hollow shape.

12. The motor device according to claim 1, further comprising:
a second base portion;
a second transmission portion that is formed with the second base portion as one member and is wound around at least a part of an outer periphery of the rotator; and
a second driving portion which is supported by the second base portion, moves the second transmission portion by a certain distance in a state in which a rotational force is transmitted between the rotator and the second transmission portion, and returns the second transmission portion to a predetermined position in a state in which the rotation force transmission state is released.

13. A robot device comprising:
a rotation shaft member; and
a motor device that rotates the rotation shaft member,
wherein the motor device according to claim 1 is used as the motor device.

14. A motor device comprising:
a transmission portion that is wound around at least a part of an outer periphery of a rotator;
a driving portion which moves the transmission portion by a certain distance in a state in which a rotational force is transmitted between the rotator and the transmission portion, and returns the transmission portion to a predetermined position in a state in which the rotation force transmission state is released;
an elastic portion that causes an elastic force to act on the transmission portion in a direction that is separated from the rotator; and
a base portion that surrounds an outer periphery of the transmission portion,
wherein the elastic portion is disposed between the transmission portion and the base portion.

15. The motor device according to claim 14,
wherein the elastic portion is provided on an outer peripheral surface or an inner peripheral surface of the transmission portion.

16. The motor device according to claim 14,
wherein the transmission portion is formed in any shape of a linear shape, a band shape or a chain shape, and
wherein the elastic portion has a plurality of elastic members that is provided along a longitudinal direction of the transmission portion.

17. The motor device according to claim 14,
wherein the elastic portion is disposed so as to be able to reduce the vibration of the transmission portion.

18. The motor device according to claim 14,
wherein one end of the elastic portion is connected to the transmission portion and other end of the elastic portion is connected to the base portion.

19. The motor device according to claim 14,
wherein the transmission portion, the base portion, and the elastic portion are formed in one member.

20. The motor device according to claim 14,
wherein the elastic portion has an elastic body that is disposed so as to be embedded between the transmission portion and the base portion.

21. The motor device according to claim 20,
wherein the elastic body is formed from a gel material.

22. The motor device according to claim 20,
wherein the elastic body is disposed so as to be able to transmit the heat between the transmission portion and the base portion.

23. The motor device according to claim 14,
wherein the transmission portion is formed in an elastically deformable manner.

24. The motor device according to claim 14,
wherein the transmission portion has one end portion and another end portion, and
wherein the driving portion has a pair of electromechanical conversion elements that are connected to the one end portion and the other end portion.

25. The motor device according to claim 24,
wherein the one end portion and the other end portion are disposed in positions that interpose a standard position on the outer periphery of the rotator therebetween, and
wherein the pair of electromechanical conversion elements are disposed in positions that interpose the one end portion and the other end portion therebetween.

26. The motor device according to claim 14,
wherein the rotator is configured in a hollow shape.

27. A motor device comprising:
a base portion;
a transmission portion that is formed with the base portion in one member and is wound around at least a part of a rotator, the transmission portion and the base portion being formed in one plate shape member;
a driving portion that, while a rotational force is transmitted between the rotator and the transmission portion, moves the transmission portion by a certain distance, and that, while the rotation force transmission state is released, returns the transmission portion to a predetermined position; and
a portion that is formed with the base portion in one member and supports the transmission portion.

28. A motor device comprising:
a base portion;
a transmission portion that is formed with the base portion as one member and is wound around at least a part of an outer periphery of a rotator, the transmission portion having at least one cut portion; and
a driving portion which is supported by the base portion, moves the transmission portion by a certain distance in a state in which a rotational force is transmitted between the rotator and the transmission portion, and returns the transmission portion to a predetermined position in a state in which the rotation force transmission state is released.

29. A motor device comprising:
a first base portion;
a first transmission portion that is formed with the first base portion as one member and is wound around at least a part of an outer periphery of a rotator;
a first driving portion which is supported by the first base portion, moves the first transmission portion by a certain distance in a state in which a rotational force is transmitted between the rotator and the first transmission portion, and returns the first transmission portion to a predetermined position in a state in which the rotation force transmission state is released;
a second base portion;
a second transmission portion that is formed with the second base portion as one member and is wound around at least a part of an outer periphery of the rotator; and
a second driving portion which is supported by the second base portion, moves the second transmission portion by a certain distance in a state in which a rotational force is transmitted between the rotator and the second transmission portion, and returns the second transmission portion to a predetermined position in a state in which the rotation force transmission state is released.

30. A motor device comprising:

a base portion;

a transmission portion that is formed with the base portion in one member and is wound around at least a part of a rotator, the transmission portion having at least one cut portion;

a driving portion that, while a rotational force is transmitted between the rotator and the transmission portion, moves the transmission portion by a certain distance, and that, while the rotation force transmission state is released, returns the transmission portion to a predetermined position; and a portion that is formed with the base portion in one member and supports the transmission portion.

* * * * *